US009767655B2

(12) United States Patent
Yang et al.

(10) Patent No.: US 9,767,655 B2
(45) Date of Patent: Sep. 19, 2017

(54) METHODS, SYSTEMS AND APPARATUS FOR PROVIDING NOTIFICATION THAT A WIRELESS COMMUNICATION DEVICE HAS BEEN LEFT INSIDE A VEHICLE

(71) Applicant: GM GLOBAL TECHNOLOGY OPERATIONS LLC, Detroit, MI (US)

(72) Inventors: Linxuan Yang, Oshawa (CA); Jarvis Chau, Markham (CA); Mark A. Manickaraj, Ajax (CA); Neeraj R. Gautama, Whitby (CA); Norman J. Weigert, Whitby (CA); Frederick T. Dixon, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 397 days.

(21) Appl. No.: 14/069,219

(22) Filed: Oct. 31, 2013

(65) Prior Publication Data

US 2015/0116103 A1 Apr. 30, 2015

(51) Int. Cl.
*B60Q 1/00* (2006.01)
*G08B 1/08* (2006.01)
*G08B 21/24* (2006.01)

(52) U.S. Cl.
CPC ............... *G08B 1/08* (2013.01); *G08B 21/24* (2013.01)

(58) Field of Classification Search
CPC .......... B60K 35/00; B60K 37/02; B60C 9/00; B60C 1/00; B60C 9/008; G08B 1/08
USPC .......................................................... 340/438
See application file for complete search history.

(56) References Cited

U.S. PATENT DOCUMENTS

2005/0046580 A1* 3/2005 Miranda-Knapp ............... G08B 13/1418 340/686.1
2011/0124326 A1* 5/2011 Kudo ..................... G08B 21/24 455/420

FOREIGN PATENT DOCUMENTS

JP 2009020731 A * 1/2009 ............. G08B 21/24

* cited by examiner

*Primary Examiner* — Kerri McNally
*Assistant Examiner* — Sharmin Akhter
(74) *Attorney, Agent, or Firm* — Lorenz & Kopf, LLP

(57) ABSTRACT

Computer-implemented methods, systems and apparatus are disclosed for providing notification at a vehicle that a pre-paired consumer electronics device (CED) has been left inside the vehicle. The vehicle includes a processor and a vehicular system controllable via the processor. The processor can receive an alert signal that indicates that a pre-paired CED has been left inside the vehicle during a time period after a trigger event has occurred. The processor is further configured to control activation of the vehicular system, in response to receiving the alert signal, to cause the vehicular system to generate another signal that is perceptible outside the vehicle to indicate that the pre-paired CED has been left inside the vehicle.

21 Claims, 8 Drawing Sheets

METHODS, SYSTEMS AND APPARATUS FOR PROVIDING NOTIFICATION THAT A WIRELESS COMMUNICATION DEVICE HAS BEEN LEFT INSIDE A VEHICLE

TECHNICAL FIELD

The technical field generally relates to vehicle communications, and more particularly relates to methods, systems and apparatus for providing notification that a consumer electronics device (CED) has been left inside a vehicle.

BACKGROUND

Many vehicles today include on-board computers that perform a variety of functions. For example, on-board computers control operation of the engine, control systems within the vehicle, provide security functions, perform diagnostic checks, provide information and entertainment services to the vehicle, perform navigation tasks, and facilitate communications with other vehicles and remote driver-assistance centers. Telematics service systems, for example, provide services including in-vehicle safety and security, hands-free calling, turn-by-turn navigation, and remote-diagnostics.

On-board computers also facilitate delivery to the driver of information and entertainment, which are sometimes referred to collectively as infotainment. Infotainment can be delivered in any of a wide variety of forms, including text, video, audio, and combinations of these.

Many consumers today regularly use portable consumer electronics devices, such as smartphones. Forgetting one's consumer electronics device can be inconvenient for a variety of reasons. For instance, when a user leaves their smartphone inside a vehicle, and departs from the vehicle, it can be very inconvenient and/or time-consuming to have travel back to the vehicle to retrieve the consumer electronics device.

Accordingly, it is desirable to provide methods and systems that can alert a user when they leave their consumer electronics device inside a vehicle before they travel too far away. Furthermore, other desirable features and characteristics of the disclosed embodiments will become apparent from the subsequent detailed description and the appended claims, taken in conjunction with the accompanying drawings and the foregoing technical field and background.

SUMMARY

The disclosed embodiments relate to providing notification that a consumer electronics device (CED) has been left inside a vehicle.

In one embodiment, a vehicle is provided that includes a processor and a vehicular system controllable via the processor. The processor is configured to receive an alert signal (e.g., communicated from a telematics server to the vehicle or directly from a pre-paired consumer electronics device (CED) to the vehicle). The alert signal indicates that a pre-paired CED has been left inside the vehicle during a time period after a trigger event has occurred. The processor is further configured to control activation of the vehicular system, in response to receiving the alert signal, to cause the vehicular system to generate another signal that is perceptible outside the vehicle to indicate that the pre-paired CED has been left inside the vehicle.

In another embodiment, a system is provided that includes a vehicle, and a pre-paired consumer electronics device (CED). The vehicle includes a first processor and a vehicular system that is controllable via the first processor. The pre-paired CED includes a second processor configured to execute an application comprising computer-executable instructions. When the second processor receives an indication that a trigger event has occurred, the application that is executed by the second processor can determine whether the pre-paired CED has moved after receiving the indication that the trigger event has occurred. When it is determined that the pre-paired CED has not moved, the second processor can transmit message that indicates that the pre-paired CED has been left inside the vehicle, and in response to the message, the first processor of the vehicle can control activation of the vehicular system. In particular, the first processor can cause the vehicular system to generate another signal that is perceptible outside the vehicle. This signal indicates that the pre-paired CED has been left inside the vehicle.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
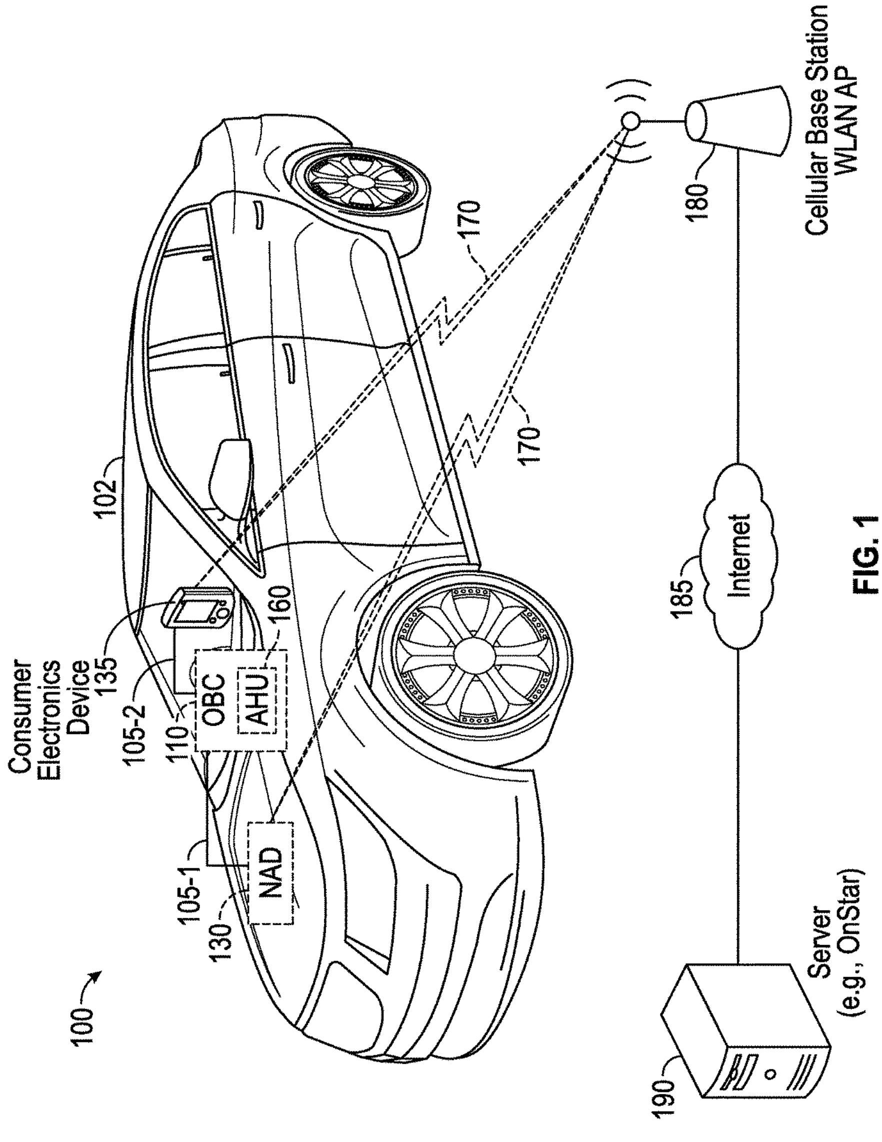
FIG. 1 is a communication system in accordance with various embodiments.

Various embodiments of the present disclosure are disclosed herein. The disclosed embodiments are merely examples that may be embodied in various and alternative forms, and combinations thereof. The following detailed description is merely exemplary in nature and is not intended to limit the application and uses. The word "exemplary" is used exclusively herein to mean "serving as an example, instance, or illustration." Any embodiment described herein as "exemplary" is not necessarily to be construed as preferred or advantageous over other embodiments. As used herein, for example, “exemplary” and similar terms, refer expansively to embodiments that serve as an illustration, specimen, model or pattern. Furthermore, there is no intention to be bound by any expressed or implied theory presented in the preceding technical field, background, brief summary or the following detailed description.

Overview

Before describing some of the disclosed embodiments, it should be observed that the disclosed embodiments generally relate to systems that include a consumer electronics device (CED) (e.g., wireless communication device such as a smartphone), that is pre-paired with a vehicle, such as an automobile, having an onboard computer system that is configured to communicate with the pre-paired CED and with a telematics server. The onboard computer system can provide a notification to the person that their pre-paired CED is not with them shortly after they leave the vehicle so that they are notified that they do not have their pre-paired CED with them (e.g., notified that they are leaving the vehicle without their pre-paired CED).

The system is able to detect or determine that a pre-paired CED has been left behind in the vehicle by determining whether the pre-paired CED has moved within a period after a trigger event takes place (e.g., within a period after the vehicle shuts off and/or the doors open and/or lock). When the pre-paired CED has been left in the vehicle, the occupant can be notified that they have forgotten their pre-paired CED in the vehicle, for example, directly via the pre-paired CED or indirectly via a telematics service. For instance, a processor within the vehicle can issue a command to a processor of the vehicle that will cause a system of the vehicle to honk the horn of the vehicle, flash the lights, etc. This way, the disclosed embodiments can automatically alert or notify a person within a short period of time (e.g., X seconds) if they have left a vehicle without their CED. For instance, the disclosed embodiments can be used to notify the driver when they have parked their vehicle and left their pre-paired CED in the vehicle (e.g., left it charging in the vehicle but failed to unplug it). In essence, it provides a warning to the user of the pre-paired CED that they left their pre-paired CED in the vehicle so that they can go back and retrieve it. Notably, the disclosed embodiments can be implemented using existing hardware with some additional software applications being added at the pre-paired CED, onboard computer system and the telematics server.

FIG. 1 is a communication system 100 in accordance with various embodiments. The communication system 100 includes a vehicle 102, a consumer electronics device (CED) 135, communication infrastructure 180, a network 185 such as the Internet, and a telematics server 190.

The vehicle 102 includes an embedded network access device (NAD) 130 that is communicatively coupled to an onboard computer system 110 of the vehicle 102.

The onboard computer system 110 includes an automotive head unit (AHU) 160. The embedded NAD 130 and the AHU 160 can be communicatively coupled over any type of communication link including, but not limited to a wired communication link such as a bus 105-1 or USB connection, or a wireless communication link such as a Bluetooth communication link or WLAN communication link, etc. An example implementation of the onboard computer system 110 will be described below with reference to FIG. 2. Further, it is noted that although the embedded NAD 130 and AHU 160 are illustrated as separate blocks that are coupled via the bus 105-1, in other embodiments, the NAD 130 can be part of the AHU 160.

The NAD 130 is a communication device that is physically and mechanically integrated/embedded within the vehicle 102. The embedded NAD 130 allows the vehicle 102 to communicate information over-the-air using one or more wireless communication links 170. The embedded NAD 130 allows the onboard computer system 110 including the AHU 160 of the vehicle 102 to exchange information over wide area networks 185, such as the Internet, and to communicate with external networks and infrastructure such as the telematics server 190 so that they can communicate and share information with each other. This information can be in the form of packetized data that can include data, control information, audio information, video information, textual information, etc.

The CED 135 (also referred to below simply as a device 135) can be any type of electronics device that is capable of wireless communication with a network that is external to the vehicle, and includes elements such as a transceiver, computer readable medium, processor, and a display that are not illustrated in FIG. 1. Those elements will be described below with reference to FIG. 3. The CED 135 can be, for example, any number of different portable wireless communications devices, such as personal or tablet computers, cellular telephones, smartphones, etc. As used herein, it is noted that a CED 135 is not a key fob since a key fob is not able to connect to and communicate wirelessly with a network that is external to the vehicle.

In the embodiment of FIG. 1, the CED 135 is a smartphone. In this regard, it is noted that as used herein, a smartphone refers to a mobile telephone built on a mobile operating system with more advanced computing capability and connectivity than a feature phone. In addition to digital voice service, a modern smartphone has the capability of running applications and connecting to the Internet, and can provide a user with access to a variety of additional applications and services such as text messaging, e-mail, Web browsing, still and video cameras, MP3 player and video playback, etc. Many smartphones can typically include built in applications that can provide web browser functionality that can be used display standard web pages as well as mobile-optimized sites, e-mail functionality, voice recognition, clocks/watches/timers, calculator functionality, personal digital assistant (PDA) functionality including calendar functionality and a contact database, portable media player functionality, low-end compact digital camera functionality, pocket video camera functionality, navigation functionality (cellular or GPS), etc. In addition to their built-in functions, smartphones are capable of running an ever growing list of free and paid applications that are too extensive to list comprehensively.

The CED 135 is Bluetooth-enabled meaning that it includes a Bluetooth-compliant communication interface including a Bluetooth antenna and a Bluetooth chipset having a Bluetooth controller and a host (not illustrated in FIG. 1) as defined in the any of the Bluetooth communication standards that are incorporated by reference herein. The Bluetooth chipset generates signals to be transmitted via the Bluetooth antenna, and also receives signals transmitted from other Bluetooth-enabled interfaces via their Bluetooth antennas. In this regard, it is noted that the CED 135 and a Bluetooth interface (not illustrated) of the vehicle 102 both include a Bluetooth antenna (not illustrated) and one or more Bluetooth chipset(s) (not illustrated) so that they are capable of implementing all known Bluetooth standards and protocols including a Bluetooth Low Energy (BLE) protocol. Bluetooth technical specifications are developed and published by the Bluetooth Special Interest Group (SIG). Bluetooth Core Specification Version 4.0, adopted Jun. 30, 2010, Core Specification Supplement (CSS) v1 adopted Dec. 27, 2011, Core Specification Addendum (CSA) 2 adopted Dec. 27, 2011, Core Specification Supplement (CSS) v2 adopted Jul. 24, 2012, and Core Specification Addendum (CSA) 3 adopted Jul. 24, 2012, describe various features of the BLE standards. Copies of any of the Core Specifications, including the Bluetooth Specification Version 4.0, can be obtained from the Bluetooth Special Interest Group (SIG) by contacting them in writing at Bluetooth Special Interest Group, 5209 Lake Washington Blvd NE, Suite 350, Kirkland, Wash. 98033, USA, or by visiting their website and downloading a copy. Bluetooth Core Specification Version 4.0 includes Classic Bluetooth, Bluetooth High Speed (HS) protocols and Bluetooth Low Energy (BLE).

Figure 2:
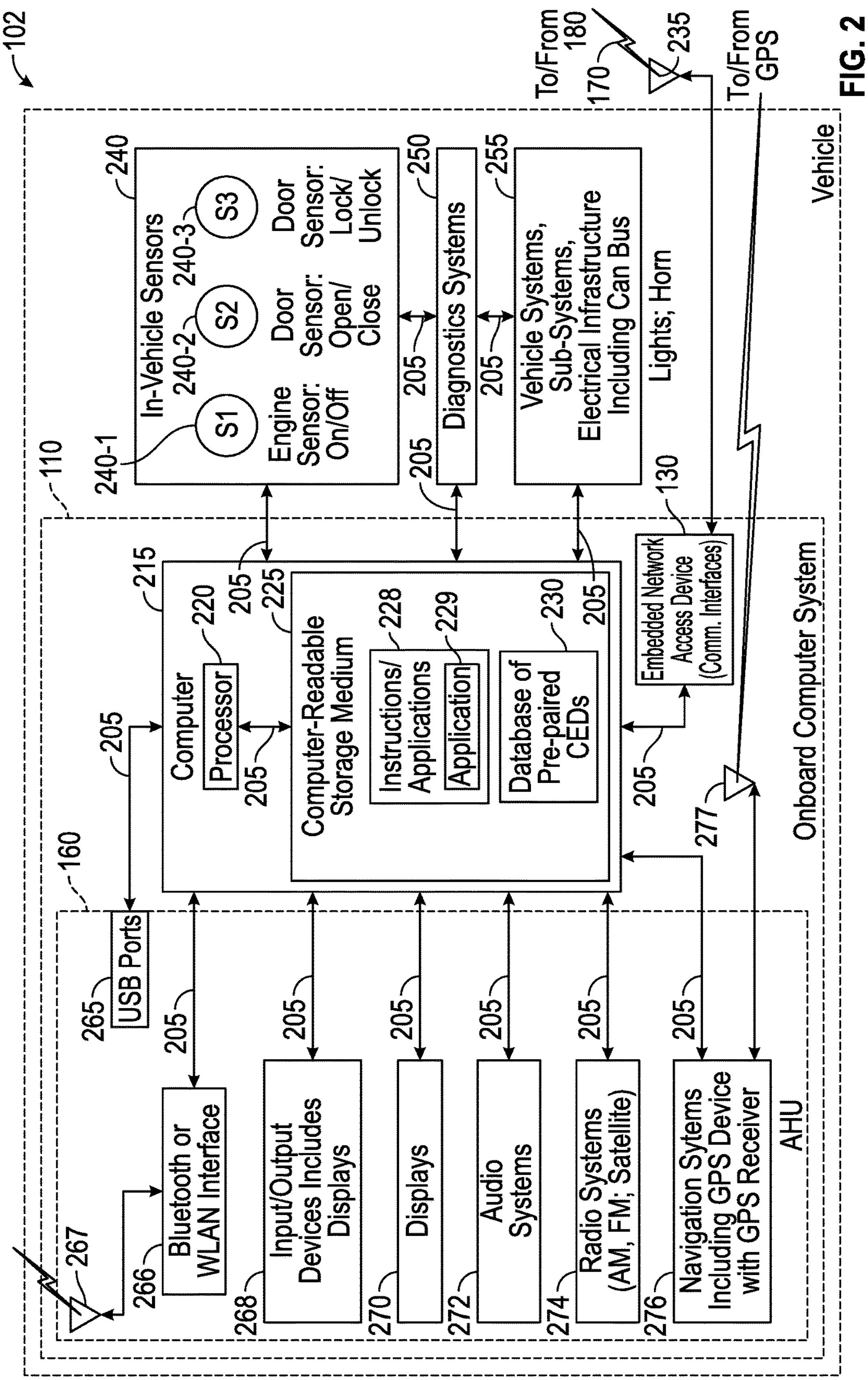
FIG. 2 is a diagram that illustrates a portion of a vehicle in accordance with one exemplary implementation of the disclosed embodiments.

Because the CED 135 is portable it can be present inside the vehicle 102 (e.g., when carried into the vehicle 102 by a person such as the driver, a passenger, or occupant), or can be located outside the vehicle 102. For instance, the CED 135 can be carried close to or inside the vehicle 102 or can be carried relatively far away from the vehicle 102. When the CED 135 is located in (or alternatively in communication range of) of the AHU 160, the CED 135 can establish a wired or wireless connection with a wireless interface of the AHU 160. The CED 135 can be carried into the vehicle 102 by an occupant and can then be communicatively coupled to the USB ports via wired connection or can establish a connection to the wireless interfaces of AHU 160 over a short-range wireless communication link. When the CED 135 is coupled to the AHU 160, it can transmit information to the AHU 160 or receive information from the AHU 160 as data packets (e.g., as IP packets) via a USB connection to ports or via a Bluetooth or WLAN link to corresponding interfaces. When the CED 135 is located outside the vehicle 102 (e.g., when removed from the vehicle 102), and it moves outside communication range of the wireless interface of the AHU 160 its communication link and connection with the wireless interface of the AHU 160 can be disrupted (e.g., terminated). For instance, as illustrated in FIG. 2, the CED 135 can be far enough away from the vehicle 102 such that it is not possible for it to couple to the USB ports via wired connection or to establish a connection to the wireless interfaces.

In this context, the term "connected" means that the pre-paired CED 135 and at least one wireless communication interface (e.g., WLAN interface 266 or Bluetooth interface 266 or a wireless interface implemented at the embedded NAD 130) of the onboard computer system 110 have established a connection and are presently in a connected state that allows them to communicate with one another. The "connection" between the pre-paired CED 135 and the onboard computer system 110 can be a wireless point-to-point connection over a short range wireless communication link. For example, as noted above, both the CED 135 and the Bluetooth interface 266 include a Bluetooth antenna and Bluetooth chipset(s) and are capable of implementing all known Bluetooth standards and protocols including a Bluetooth Low Energy (BLE) protocol, and therefore, in one embodiment, the wireless connection can be a Bluetooth or BLE connection over a Bluetooth or BLE communication link. In one embodiment, the processor 220 can determine or process signal strength of a signal received from the pre-paired CED 135 to determine whether a pre-paired CED 135 is connected to the onboard computer system 110. In addition, in some implementations in which the pre-paired CED 135 is enabled to establish radio communication with the onboard computer system 110 using near field communication (NFC), the "connection" between the pre-paired CED 135 and the onboard computer system 110 can be detected based on near field communications between the pre-paired CED 135 and the onboard computer system 110. As is known in the art, NFC standards cover communications protocols and data exchange formats that are based on existing radio-frequency identification (RFID) standards including, for example, ISO/IEC 14443 and ISO/IEC 18092 and those defined by the NFC Forum.

The communication infrastructure 180 is communicatively coupled to the telematics server 190 through a network 185, such as, the Internet. The communication infrastructure 180 allows the NAD 130 to communicate with the external networks and the remotely located telematics server 190 over wireless communication link(s) 170. Communication infrastructure 180 can generally be any public or private access point that provides an entry/exit point for the NAD 130 to communicate with an external communication network 185 over wireless communication link(s) 170. Communications that utilize communication infrastructure 180 are sometimes referred to colloquially as vehicle-to-infrastructure, or V2I, communications. Depending on the implementation, the communication infrastructure 180 can be a cellular base station, a WLAN access point, a satellite, etc. that is in communication with telematics server 190 via network 185. Thus, the communication infrastructure 180 can include, for example, long-range communication nodes (e.g., cellular base stations or communication satellites) and shorter-range communication nodes (e.g., WLAN access points) that are communicatively connected to the communication network 185. In one embodiment, the wireless communication link 170 can be, for example, a third-generation (3G) or fourth generation (4G) communication link. Communications between NAD 130 and shorter-range communication nodes are typically facilitated using IEEE 802.x or Wi-Fi®, Bluetooth®, or related or similar standards. Shorter-range communication nodes can be located, for example, in homes, public accommodations (coffee shops, libraries, etc.), and as road-side infrastructure such as by being mounted adjacent a highway or on a building in a crowded urban area.

The network 185 can include a wide area network, such as one or more of a cellular telephone network, the Internet, Voice over Internet Protocol (VoIP) networks, local area networks (LANs), wide area networks (WANs), personal area networks (PANs), and other communication networks. Communications from the NAD 130 to the remote telematics server 190, and from the remote telematics server 190 to the NAD 130, can traverse through the communication network 185.

The telematics server 190 is a backend server (or servers) that include computer hardware for implementing the telematics server 190 that can provide information/content that can then be communicated over a network 185, such as the Internet, to communication infrastructure 180. The telematics server 190 can provide services to the vehicle 102 such as Global Positioning System (GPS) services and theft prevention services, alert services, and warning services. In some implementations, the telematics server 190 can be associated with a commercial telematics service (e.g., OnStar) that generates information and communicates it over the network 185 to communication infrastructure 180. The information/content provided by the telematics server 190 can include, for example, vehicle control information, telematics information, diagnostics information, GPS information (or any type of information that indicates the location or position or speed or acceleration of the CED 135 including information that indicates the location or position of the CED 135 with respect to the vehicle 102), etc. These are some non-limiting example of the types of information that can be generated at the telematics server 190 and then communicated to the communication infrastructure 180. Communication infrastructure 180 then communicates that information or content from the telematics server 190 over wireless communication link(s) 170 to a NAD 130. This way, the NAD 130 provides wireless connectivity to the telematics server 190 over the wireless communication link 170.

The NAD 130 can then provide this information to a processor (not illustrated in FIG. 1) located in the vehicle 102 that processes the information from the telematics server 190.

Further details regarding this system 100 will now be described below with reference to FIGS. 2-6.

FIG. 2 is a diagram that illustrates a portion of a vehicle 102 in accordance with one exemplary implementation of the disclosed embodiments. The vehicle 102 includes an onboard computer system 110, an embedded NAD 130, vehicle sensors 240, vehicle diagnostic systems 250, and vehicle systems, sub-systems and electrical infrastructure 255.

In the particular example that is illustrated in FIG. 2, the onboard computer system 110 includes the embedded NAD 130, the AHU 160 and a computer 215. The embedded NAD 130, the AHU 160 and the computer 215 are coupled to each other via one or more in-vehicle buses 205 that are illustrated in FIG. 2 by one or more bus line(s) 205. The bus 205 includes various wired paths that are used to interconnect the various systems and route information between and among the illustrated blocks of FIG. 2. As used herein, the bus 205 can include any internal vehicle bus including a Controller Area Network (CAN) bus. As is known in the art, a CAN bus is a vehicle bus standard designed to allow microcontrollers and devices to communicate with each other within a vehicle without a host computer. Among other things, a CAN bus allows electronic control units (ECUs) for various sub-systems, which are collectively represented by processor 220 in FIG. 2) to communicate with each other. For instance, the CAN bus can allow control units such as an engine control unit (also engine control module/ECM or Powertrain Control Module/PCM), transmission control unit, airbag control unit, antilock braking system (ABS) control unit, cruise control, electric power steering (EPS) control unit, audio systems, windows, doors, mirror adjustment, battery and recharging systems for hybrid/electric cars, etc. to communicate with one another.

Although the embedded NAD 130, the AHU 160 and the computer 215 are illustrated as being part of the onboard computer system 110, those skilled in the art will appreciate that the embedded NAD 130, the AHU 160 and the computer 215 (and the various sub-blocks thereof) can separate units that can be distributed throughout the vehicle 102. Thus, although certain blocks are indicated as being implemented with the onboard computer system 110, in other embodiments, any of these blocks can be implemented elsewhere within the vehicle 102 inside the onboard computer system 110.

The computer 215 includes at least one computer processor 220 that is in communication with a tangible, non-transitory computer-readable storage medium 225 (e.g., computer memory) by way of a communication bus 205 or other such computing infrastructure. The processor 220 is illustrated in one block, but may include various different processors and/or integrated circuits that collectively implement any of the functionality described herein. The processor 220 includes a central processing unit (CPU) that is in communication with the computer-readable storage medium 225, and input/output (I/O) interfaces that are not illustrated in FIG. 2 for sake of clarity. In some implementations, these I/O interfaces can be implemented at I/O devices 268, displays 270, and audio systems 272 that are shown within the AHU 160. An I/O interface (not illustrated) may be any entry/exit device adapted to control and synchronize the flow of data into and out of the CPU from and to peripheral devices such as input/output devices 268, displays 270, and audio systems 272.

As will be explained in greater detail below, the processor 220 can receive information from each of the other blocks illustrated in FIG. 2 (e.g., information provided over a bus within the vehicle or over wide area networks, such as the Internet, information such as video data, voice data, e-mail, information from diagnostics systems, information detected by the sensors 240, information provided by the navigation systems 276, etc.), process this information, and generate communications signals that convey selected information to any of the other blocks illustrated in FIG. 2.

The term computer-readable medium and variants thereof, as used in the specification and claims, refer to any known non-transitory computer storage media that can include any known form of computer-usable or computer-readable medium. The computer-readable (storage) medium 225 can be any type of memory technology including any types of read-only memory or random access memory or any combination thereof. For example, storage media could include any of random-access memory (RAM), read-only memory (ROM), electrically erasable programmable read-only memory (EEPROM), solid state memory or other memory technology, CD ROM, DVD, other optical disk storage, magnetic tape, magnetic disk storage or other magnetic storage devices, and any other medium that can be used to store desired data. The computer-readable (storage) medium 225 encompasses a wide variety of memory technologies that include, for example but not limited to, an electronic, magnetic, optical, electromagnetic, infrared, or semiconductor system, apparatus, device, or propagation medium. Some non-limiting examples can include, for example, volatile, non-volatile, removable, and non-removable memory technologies. For sake of simplicity of illustration, the computer-readable medium 225 is illustrated as a single block within computer 215; however, the computer-readable storage medium 225 can be distributed throughout the vehicle including in any of the various blocks illustrated in FIG. 2, and can be implemented using any combination of fixed and/or removable storage devices depending on the implementation.

The computer-readable storage medium 225 stores instructions 228 that, when executed by the processor, cause the processor 220 to perform various acts as described herein. The computer-readable storage medium 225 stores instructions 228 that can be loaded at the processor 220 and executed to generate information that can be communicated to the AHU 160 and any of the other blocks illustrated in FIG. 2. The instructions 228 may be embodied in the form of one or more programs or applications (not shown in detail) that may be stored in the medium 225 in one or more modules. While instructions 228 are shown generally as residing in the computer-readable storage medium 225, various data, including the instructions 228 are in some embodiments stored in a common portion of the storage medium, in various portions of the storage medium 225, and/or in other storage media.

The computer-readable storage medium 225 also a database 230 of pre-paired CEDs that includes identifier information for each CED that has been paired with the vehicle 102. As will be described in greater detail below, the processor can then use this information to determine which CEDs have been paired with the vehicle 102 when it checks for pre-paired CEDs that are connected to the vehicle 102. As used herein, a "pre-paired CED" is any CED that has been authorized to be paired with the vehicle 102. The pairing can be a unidirectional pairing (e.g., that only the AHU has knowledge of) or a bidirectional pairing (e.g., that both the AHU and the CED(s) have knowledge of). In some implementations, the telematics server 190 can store a list of identifiers associated with paired CED (e.g., subscriber unit identifiers (SUIDs) or electronic serial numbers (ESNs) associated paired devices) that can be provided to the vehicle 102 on a regular basis. Any known means can be used to provide this list to the telematics server 190 including, but not limited to, a secure online service that allows the list to be specified and sent to the vehicle 102. In other implementations, a user, such as the owner of the vehicle 102, can manually enter or scan a list of one or more CEDs into the AHU 160 that are authorized to be paired with the AHU 160. In general, the owner of a pre-paired CED 135 can be anyone who has had their CED paired with the vehicle 102 at the authorization of the owner of the vehicle 102. For example, the owner of the pre-paired CED 135 may be the owner of the vehicle 102 or any other occupant, driver, or passenger that the owner of the vehicle 102 has authorized to pair their CED with the vehicle 102.

The AHU 160 includes various infotainment system components that make up an infotainment system that provides passengers in the vehicle 102 with information and/or entertainment in various forms including, for example, music, news, reports, navigation, weather, and the like, received by way of radio systems, Internet radio, podcast, compact disc, digital video disc, other portable storage devices, video on demand, and the like.

In the example implementation illustrated in FIG. 2, the AHU 160 includes ports 265 (e.g., USB ports), one or more interface(s) 266 (e.g., Bluetooth and/or Wireless Local Area Network (WLAN) interface(s)) that includes one or more associated antennas 267, one or more input and output devices 268, one or more display(s) 270, one or more audio system(s) 272, one or more radio systems 274 and optionally a navigation system 276 that includes a global positioning system receiver (not illustrated). The input/output devices 268, display(s) 270, and audio system(s) 272 can collectively provide a human machine interface (HMI) inside the vehicle.

The input/output devices 268 can be any device(s) adapted to provide or capture user inputs to or from the onboard computer 110. For example, a button, a keyboard, a keypad, a mouse, a trackball, a speech recognition unit, any known touchscreen technologies, and/or any known voice recognition technologies, monitors or displays 270, warning lights, graphics/text displays, speakers, etc. could be utilized to input or output information in the vehicle 102. Thus, although shown in one block for sake of simplicity, the input/output devices 268 can be implemented as many different, separate output devices 268 and many different, separate input devices 268 in some implementations. As one example, the input/output devices 268 can be implemented via a display screen with an integrated touch screen, and/or a speech recognition unit, that is integrated into the system 160 via a microphone that is part of the audio systems 272. As such, it is noted that the input/output devices 268 (that are not illustrated) can include any of a touch-sensitive or other visual display, a keypad, buttons, or the like, a speaker, microphone, or the like, operatively connected to the processor 220. The input can be provided in ways including by audio input. For instance, the onboard computer system 110 in some embodiments includes components allowing speech-to-data, such as speech-to-text, or data-to-speech, such as text-to-speech conversions.

The displays 270 can include any types and number of displays within the vehicle. For example, the displays 270 can include a visual display screen such as a navigation display screen or a heads-up-display projected on the windshield or other display system for providing information to the vehicle operator. One type of display may be a display made from organic light emitting diodes (OLEDs). Such a display can be sandwiched between the layers of glass (that make up the windshield) and does not require a projection system. The displays 270 can include multiple displays for a single occupant or for multiple occupants, e.g., directed toward multiple seating positions in the vehicle. Any type of information can be displayed on the displays 270 including information that is generated by the server 190 of FIG. 1.

The audio systems 272 can include speakers, microphones and other audio hardware and software components including voice-recognition software.

The radio systems 274 can include any known types of radio systems including AM, FM and satellite based radio systems.

The navigation systems 276 can include a global positioning system (GPS) device for establishing a global position of the vehicle. The GPS device includes a processor and one or more GPS receivers that receive GPS radio signals via an antenna (not illustrated). These GPS receivers receive differential correction signals from one or more base stations either directly or via a geocentric stationary or LEO satellite, an earth-based station (e.g., cellular base station) or other means. This communication may include such information as the precise location of a vehicle, the latest received signals from the GPS satellites in view, other road condition information, emergency signals, hazard warnings, vehicle velocity and intended path, and any other information. The navigation systems 276 can also regularly receive information such as updates to the digital maps, weather information, road condition information, hazard information, congestion information, temporary signs and warnings, etc. from a server. The navigation systems 276 can include a map database subsystem (not illustrated) that includes fundamental map data or information such as road edges, the locations of stop signs, stoplights, lane markers etc. that can be regularly updated information with information from a server. The navigation systems 276 can receive information from various sensors (not illustrated) as is known in the art.

The ports 265 and interfaces 266 allow for external computing devices including the CED 135 to connect to the onboard computer system 110. In some embodiments, the ports 265 can include ports that comply with a USB standard, and interfaces 266 can include interfaces that comply with a Bluetooth and/or WLAN standards. This way, the CED 135 can directly communicate (transmit and receive) information with the onboard computer system 110. This information can include data, control information, audio information, video information, textual information, etc.

The embedded NAD 130 and its associated antenna(s) 235 can be integrated within the vehicle 102. The embedded NAD 130 can be communicatively coupled to various components of an onboard computer system 110 via a wireless or wired connection including via bus 205. For example, the computer 215 of the onboard computer system 110 is communicatively coupled to the embedded NAD 130 via one or more bus line(s) 205.

The NAD 130 can include at least one communication interface and at least one antenna 135, and in many cases can include a plurality of different communication interfaces. These communication interfaces can include one or more wireless communication interfaces that allow the embedded NAD 130 to communicate with communication infrastructure 180. The wireless communication interfaces of the embedded NAD 130 each include at least one transceiver having at least one receiver and at least one transmitter that are operatively coupled to at least one processor. The wireless communication interfaces that are included within the embedded NAD 130 can be implemented using any known wireless communications technologies. The embedded NAD 130 can use communication techniques that are implemented using multiple access communication methods including frequency division multiple access (FDMA), time division multiple access (TDMA), code division multiple access (CDMA), orthogonal frequency division multiple access (OFDMA) in a manner to permit simultaneous communication with communication infrastructure 180 of FIG. 1. While the embedded NAD 130 is illustrated in a single box, it will be appreciated that this box can represent multiple different wireless communication interfaces each of which can include multiple ICs for implementation of the receivers, transmitters, and/or transceivers that are used for receiving and sending signals of various types, including relatively short-range communications or longer-range communications, such as signals for a cellular communications network. The embedded NAD 130 is illustrated as being part of the onboard computer system 110, but can be implemented via one or more separate chipsets.

Depending on the particular implementation, the embedded NAD 130 can include any number of long range wireless communication interfaces and any number of short range wireless communication interfaces.

For example, the embedded NAD 130 can include wireless communication interfaces for relatively short-range communications that employ one or more short-range communication protocols, such as a dedicated short range communication (DSRC) system (e.g., that complies with IEEE 802.11p), a WiFi system (e.g., that complies with IEEE 802.11 a, b, g, IEEE 802.16, WI-FE)), BLUETOOTH®, infrared, IRDA, NFC, the like, or improvements thereof). The NAD 130 can include communication interfaces that allow for short-range communications with other devices (such as CED 135) and with other vehicles (not illustrated) (e.g., that allow the vehicle 102 to communicate directly with one or more other vehicles as part of an ad-hoc network without relying on intervening infrastructure, such as node 180). Such communications are sometimes referred to as vehicle-to-vehicle (V2V) communications. The DSRC standards, for instance, facilitate wireless communication channels specifically designed for automotive vehicles so that participating vehicles can wirelessly communicate directly on a peer-to-peer basis with any other participating vehicle. In one embodiment, at least one communication interface of the embedded NAD 130 is configured as part of a short-range vehicle communication system, and allows the vehicle 102 to directly communicate (transmit and receive) information with other nearby vehicles (not illustrated).

Likewise, the embedded NAD 130 can include wireless communication interfaces for longer-range communications such as cellular and satellite based communications that employ any known communications protocols. In one embodiment, one of the wireless communication interfaces of the embedded NAD 130 is configured to communicate over a cellular network, such as a third generation (3G) or fourth generation (4G) cellular communication network.

The embedded NAD 130 can enable the vehicle to establish and maintain one or more wireless communications links 170 (e.g., via cellular communications, WLAN, Bluetooth, and the like). The physical layer used to implement these wireless communication links can be based on any known or later-developed wireless communication or radio technology. In some embodiments, the wireless communication links can be implemented, for example, using one or more of Dedicated Short-Range Communications (DSRC) technologies, cellular radio technology, satellite-based technology, wireless local area networking (WLAN) or WI-FI® technologies such as those specified in the IEEE 802.x standards (e.g. IEEE 802.11 or IEEE 802.16), WIMAX®, BLUETOOTH®, near field communications (NFC), the like, or improvements thereof (WI-FI is a registered trademark of WI-FI Alliance, of Austin, Tex.; WIMAX is a registered trademark of WiMAX Forum, of San Diego, Calif.; BLUETOOTH is a registered trademark of Bluetooth SIG, Inc., of Bellevue, Wash.).

The embedded NAD 130 can perform signal processing (e.g., digitizing, data encoding, modulation, etc.) as is known in the art.

The vehicle sensors 240, vehicle diagnostic systems 250, and other vehicle systems, sub-systems and electrical infrastructure 255 that are communicatively coupled to the onboard computer system 110 via bus 205 or other communication link, which in one implementation can be a Controller Area Network (CAN) bus.

The onboard computer 110 is configured for receiving, processing and transmitting information received from sensors 240 that are part of the vehicle 102. The sensors 240 can include any known types of sensors employed in vehicles. The sensors 240 may be adapted to transmit and receive digital and/or analog signals. Illustrative sensors include analog or digital sensors, mechanical property sensors, electrical property sensors, audio or video sensors, or any combination thereof. As will be described in greater detail below, in accordance with the disclosed embodiments, the sensors 240 include at least a first sensor that is configured to detect a trigger event, a second sensor that is configured to detect whether a door of the vehicle has been opened, and a third sensor that detects whether the door has been locked.

The sensors 240 can include sensors that can sense, for example, environmental information and/or vehicle operation information (e.g., speed/acceleration of the vehicle, wind conditions, internal or external temperature, precipitation, visibility, wheel traction, braking, suspension, etc.), and communicate this information to the onboard computer 110. The sensors 240 can also include sensors at various locations that are used to monitor apparatus that are used for controlling the vehicle such as a brake systems, steering systems, etc. The sensors 240 can also include a velocity sensor such as a wheel speed sensor or radar velocity meter that provides an accurate measure of the vehicle velocity relative to the ground. The sensors 240 can also include temperature sensors, Pedal Position Sensors (PPSs), Throttle Position Sensors (TPSs), Mass Air Flow (MAF) sensors, Manifold Absolute Pressure (MAP) sensors, Tire Pressure Sensors, Crash Sensors, Fuel Level Sensors, Battery Charge State sensors, Airbag sensors, Engine Coolant Temperature sensors, etc. The sensors 240 can also include infrared sensors mounted on the vehicle that can be used to determine the road temperature, the existence of ice or snow.

The sensors 240 can also include one of more cameras that are mounted on the vehicle for interrogating environment nearby the host vehicle for such functions as blind spot monitoring, backup warnings, anticipatory crash sensing, visibility determination, lane following, and any other visual information. Generally, the cameras will be sensitive to infrared and/or visible light, however, in some cases a passive infrared camera will the used to detect the presence of animate bodies such as deer or people on the roadway in front of the vehicle. Frequently, infrared or visible illumination will be provided by the host vehicle.

The sensors can include a sensor 240-1 that can indicate when the engine of the vehicle 102 has been turned on or off, a group of sensors 240-2 each of which can generate an output signal that can be used to determine whether a door the vehicle has been opened, a group of sensors 240-3 each of which can generate an output signal that can be used to determine whether a door of the vehicle has been unlocked. As will be explained below, the output signals generated by these sensors can be used for various purposes including determining whether various trigger events have occurred. For instance, in one embodiment, whenever a vehicle door opens, closes or is locked after the engine is shut-off, the wireless connection between the wireless interface 266 of the AHU 160 and the wireless interface 366 of the pre-paired CED 135 will be terminated. By contrast, in another embodiment, whenever a vehicle door opens, closes or is locked after the engine is shut-off, a timer will be started and when the timer expires (or alternatively a counter can be started and when it reaches a certain count), the wireless connection between the wireless interface 266 of the AHU 160 and the wireless interface 366 of the pre-paired CED 135 will be terminated.

The diagnostics systems 250 can include any known vehicle diagnostics technologies that can provide advanced warning of potential vehicle component issues. The diagnostics systems 250 can include diagnostics for engine systems, transmission systems, emissions systems, air bag systems, braking systems, navigations systems, etc. The diagnostics systems 250 can include, or reply on input from, various sensors 240 that illustrated in a separate block for sake of simplicity of illustration.

The vehicle systems, sub-systems and electrical infrastructure 255 can include any known vehicle systems, sub-systems and electrical infrastructure. The vehicle systems, sub-systems and electrical infrastructure 255 can include the vehicle's lights and horn, among many other things. As will be explained below, in accordance with some of the disclosed embodiments, the processor 220 can receive information from one or more of the other blocks illustrated in FIG. 2 (such as the navigation systems 276, etc.), process this information, and generate signals that convey an alert or warning that a CED has been left inside the vehicle. These signals could be, for example, a signal that is visible such as a flashing internal or external light, or that is in the form of a sound (e.g., a honking horn), or any other signal that is designed to attract the attention of the those departing the vehicle. For instance, sound and/or light systems can be activated (when appropriate) to warn people that a CED has been left in the vehicle. In such cases, the system could activate the vehicle headlights, tail lights, horn, audio system 272, etc.

The AHU 160 is in communication with the processor 220 and includes a wireless communication interface 266. The wireless communication interface 266 is configured to establish a wireless connection with the pre-paired CED 135 when in communication range of the pre-paired CED 135. The CED 135 is pre-paired with the AHU 160 such that it is authorized to establish the wireless connection with the wireless communication interface 266 and exchange information with the AHU 160. In one embodiment, the wireless connection can be a Bluetooth connection that is established with the wireless communication interface 266 when the pre-paired CED 135 is within Bluetooth communication range of the wireless communication interface 266.

Upon detecting the trigger event, a sensor 240 can communicate a trigger message to the AHU 160 that indicates that the trigger event has occurred. In one embodiment, the trigger event can include, for example, the engine of the vehicle 102 stopping (as sensed by sensor 240-1), and the trigger message indicates that the engine of the vehicle 102 has stopped. The wireless communication interface 266 can transmit the trigger message to an application that is running at the pre-paired CED 135. This application will be described in greater detail below with reference to FIGS. 3 through 6.

Figure 3:
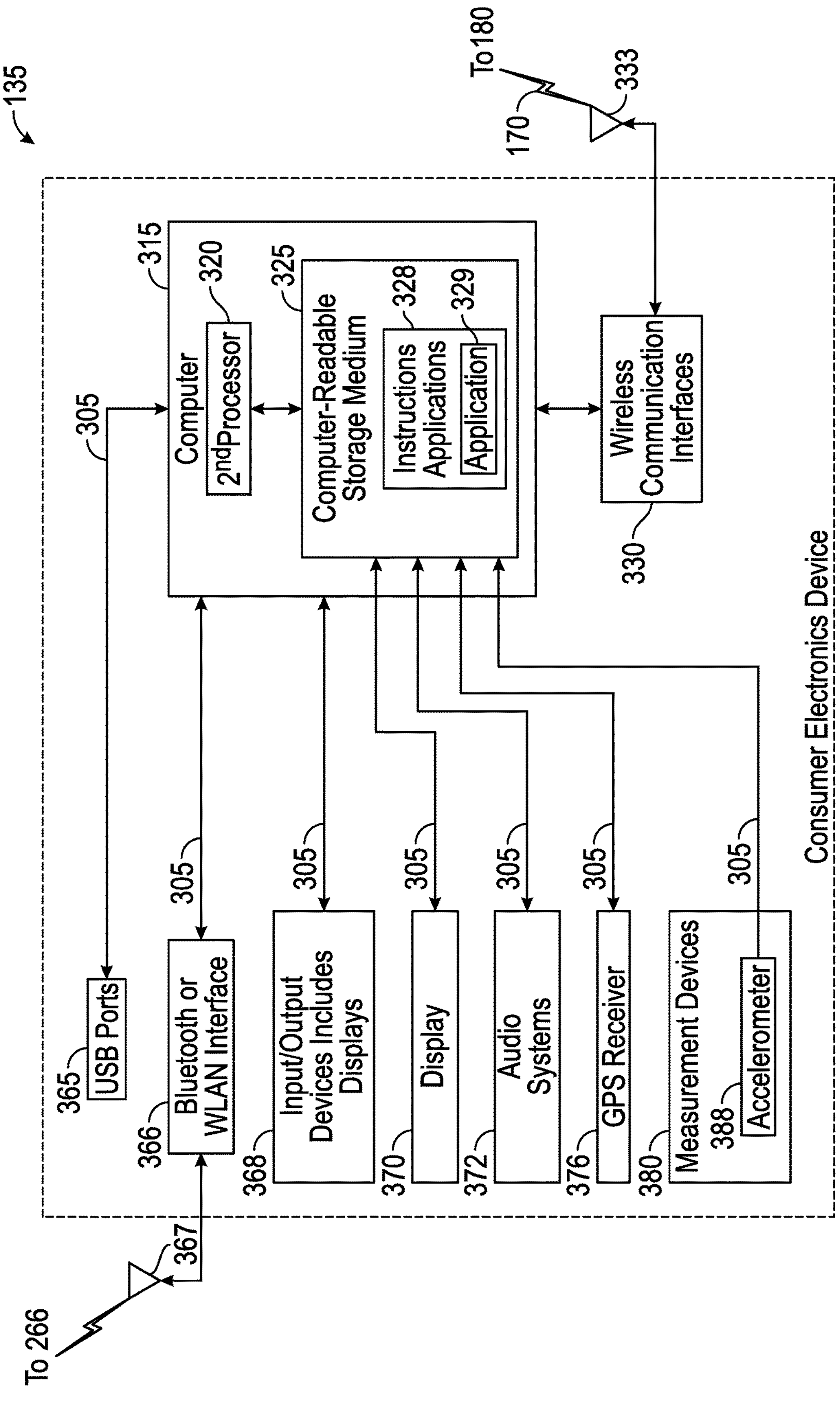
FIG. 3 is a diagram that illustrates a consumer electronics device (CED) in accordance with one example of the disclosed embodiments.

FIG. 3 is a diagram that illustrates a consumer electronics device (CED) 135 in accordance with one example of the disclosed embodiments. FIG. 3 will be described with respect to FIGS. 1 and 2.

The CED 135 includes a computer 315, one or more long-range wireless communication interfaces 330 (e.g., cellular interfaces), ports 365 (e.g., USB ports), one or more short-range wireless communication interfaces 366 (e.g., Bluetooth and/or Wireless Local Area Network (WLAN) interface(s)), input/output devices 368, display 370, audio systems 372, a GPS receiver 376, and measurement devices 380 including at least one accelerometer 388. The various components of the CED are communicatively coupled via one or more bus line(s) 305.

The computer 315 includes at least one computer processor 320 that is in communication with a tangible, non-transitory computer-readable storage medium 325 (e.g., computer memory) by way of a communication bus 305 or other such computing infrastructure. The processor 320 is illustrated in one block, but may include various different processors and/or integrated circuits that collectively implement any of the functionality described herein. The processor 320 includes a central processing unit (CPU) that is in communication with the computer-readable storage medium 325, and input/output (I/O) interfaces that are not illustrated in FIG. 3 for sake of clarity. In some implementations, these I/O interfaces can be implemented at I/O devices 368, displays 370, and audio systems 372. An I/O interface (not illustrated) may be any entry/exit device adapted to control and synchronize the flow of data into and out of the CPU from input/output devices 368, displays 370, and audio systems 372.

As will be explained in greater detail below, the processor 320 can receive information from each of the other blocks illustrated in FIG. 3, process this information, and generate communications signals that convey selected information to any of the other blocks illustrated in FIG. 3. The processor 325 of the CED 135 can perform signal processing (e.g., digitizing, data encoding, modulation, etc.) as is known in the art.

The computer-readable (storage) medium 325 can be any type of memory technology including any types described above with reference to computer-readable storage medium 225. The computer-readable storage medium 325 stores instructions 328 that, when executed by the processor, cause the processor 320 to perform various acts as described herein. The instructions 328 may be embodied in the form of one or more programs or applications (not shown in detail) that may be stored in the medium 325 in one or more modules. In accordance with the disclosed embodiments, the instructions 328 include an application 329 that will be described in greater detail below.

The input/output devices 368 can be any known types of devices adapted to provide or capture user inputs to or outputs from the computer 315 including any of those mentioned above with respect to input/output devices 268. The input/output devices 368 can include user controls such as buttons, switches and/or knobs that a user can use to interact with the processor 320, a keyboard, which can be used to enter text data to be stored or transmitted. The display 370 can be any known type of display (e.g., an LCD display, LEDs, etc.). The audio system(s) can include speakers, microphones, and a voice recognition processor. The input/output devices 368, display(s) 370, and audio system(s) 372 are known in the art and will not be described in detail herein.

The ports 365 and short-range wireless communication interfaces 366 allow for external computing devices (including the interfaces 266 of the vehicle) to wirelessly connect to and communicate with the computer 315. In some embodiments, the ports 365 can include ports that comply with a USB standard, and interfaces 366 can include interfaces that comply with a Bluetooth/WLAN standards. This way, the CED 135 can directly communicate (transmit and receive) information including data, control information, audio information, video information, textual information, etc.

The CED 135 can include at least one long-range wireless communication interface 330 and at least one antenna 333, and in many cases can include a plurality of different long-range wireless communication interfaces. These long-range wireless communication interfaces can include one or more long-range wireless communication interfaces that allow the CED 135 to communicate with communication infrastructure 180.

In this regard, it is noted that each of the wireless communication interfaces 330, 366 can include at least one radio that includes an antenna, a transceiver, and a controller/processor, which are not illustrated for sake of brevity. The communication interfaces 330, 366 can each operate over a different protocol or radio protocol in a different frequency bandwidth. The communication interfaces 330, 366 may each have their own transceiver (not shown in FIG. 3). Each of these communication interfaces 330, 366 can support certain bandwidth requirements, communication range requirements, etc. Each communication interface 330, 366 operates at a data rate (or one of a set of data rates), and operates in a frequency band (or one of a set of frequency bands) having a bandwidth. The communication interfaces generate a modulated data stream, and can demodulate data using at least one demodulation technique to generate a demodulated data stream. It will be appreciated that the communication interfaces 330, 366 are exemplary. Moreover, while the exemplary CED 135 shows two communication interfaces 330, 366, it will be appreciated that in other practical implementations additional communication interfaces (that are not shown) can be included.

Each of the wireless communication interfaces 330, 366 can include at least one controller/processor for performing at least some of the functionality described below to carry out communications with other entities in the network, at least one transceiver including transmitter circuitry and receiver circuitry, an antenna, a program memory for storing operating instructions that are executed by the controller, as well as other components that are used to implement a communication interface as will be understood by those skilled in the art. In this regard, the wireless communication interfaces 330, 366 can each have their own transceiver that includes transmitter circuitry and receiver circuitry to communicate information packets to and acquire information packets from the other nodes or network entities within the communication network. In other embodiments, portions of the transmitter circuitry and receiver circuitry may be shared amongst the wireless communication interfaces. The transmitter circuitry and the receiver circuitry include circuitry to enable digital or analog transmissions over a communication channel. The implementations of the transmitter circuitry and the receiver circuitry depend on the implementation. For example, the transmitter circuitry and the receiver circuitry can be implemented as an appropriate modem, or as conventional transmitting and receiving components of communication devices. The modem can be internal to the CED 135 or insertable into the CED 135 (e.g., embodied in a wireless a radio frequency (RF) modem implemented on a Personal Computer Memory Card International Association (PCMCIA) card). The transmitter circuitry and the receiver circuitry are preferably implemented as part of the wireless device hardware and software architecture in accordance with known techniques. In some implementations, the receiver circuitry is capable of receiving RF signals from at least one frequency bandwidth and optionally more than one frequency bandwidth, if the communications with the proximate device are in a frequency band other than that of the network communications. The transceiver includes at least one set of transmitter circuitry. The at least one transmitter may be capable of transmitting to multiple devices over multiple frequency bands. As with the receiver, multiple transmitters may optionally be employed. In one implementation, one transmitter can be used for the transmission to a proximate node (e.g., interface 266) or direct link establishment, and other transmitters can be used for transmission to a cellular BS(s). Any one of the antennas 333, 367 can include any known or developed structure for radiating and receiving electromagnetic energy in the frequency range containing the wireless communication frequencies.

In some implementations, most, if not all, of the functions of the transmitter circuitry and/or the receiver circuitry, as well as the communication interfaces can be implemented in a controller, such as the processor 320. However, the processor 320 and the communication interfaces 330, 366 have been artificially partitioned herein to facilitate a better understanding. As such, boxes 330, 366 can represent multiple different wireless communication interfaces each of which can include multiple ICs for implementation of the receivers, transmitters, and/or transceivers that are used for receiving and sending signals of various types, including relatively long-range communications, such as signals for a cellular communications network, such as a third generation (3G) or fourth generation (4G) cellular communication network. Each of the long-range wireless communication interfaces 330 can be implemented via one or more separate chipsets. The long-range wireless communication interfaces 330 of the CED 135 each include at least one transceiver having at least one receiver and at least one transmitter that are operatively coupled to at least one processor.

The long-range wireless communication interfaces 330 that are included within the CED 135 can be implemented using any known wireless communications technologies including any of those mentioned above with reference to FIG. 2. For example, interface 330 can utilize any one of a number of different multiple access techniques such as Frequency Division Multiplexing (FDM), Time Division Multiplexing (TDM), Code Division Multiplexing (CDM), and others. Examples of multiple access schemes which can be used in the network can include any one or more of time division multiple access (TDMA), direct sequence or frequency hopping code division multiple access (CDMA), Global System for Mobile communication (GSM), Wideband CDMA (WCDMA), Universal Mobile Telecommunications System (UMTS), frequency division multiple access (FDMA), orthogonal frequency division multiplexing (OFDM), opportunity division multiple access (ODMA), a combination of any of the foregoing multiple access technologies, a multiple access technology in which portions of the frequency spectrum to be used are determined by local signal quality measurements and in which multiple portions of the frequency spectrum may be used simultaneously, or any other multiple access or multiplexing methodology or combination thereof. In one implementation, the long-range wireless communication interfaces 330 that are included within the CED 135 include a Long Term Evolution (LTE) compliant communication interface.

As noted above, the interfaces in block 366 can include a WLAN interface and a Bluetooth interface 366.

The WLAN interface 366 is used for communication between the CED 135 and other WLAN-enabled devices. The WLAN interface 366 can be, for example, an ad hoc networking air interface, and in this exemplary embodiment is an IEEE 802.11 WLAN communication interface which complies with any of the IEEE 802.11 Standards and specifications (e.g., IEEE 802.11(a), (b), (g) or (n)). The WLAN interface 366 can also be any communication interface which complies with any of the other IEEE 802.11 Standards, any of the IEEE 802.16 Standards, or another wireless standard. For example, WLAN interface 366 can be a communication interface which complies with the IEEE 802.16e WiMax specifications. In some implementations, the WLAN interface 366 can be, for example, an ultrawide band (UWB) communication interface which implements a Multiple Input Multiple Output (MIMO) communication interface which operates using Orthogonal Frequency Division Multiplexing (OFDM) modulation techniques or other modulation techniques. Alternatively, it will be appreciated that the WLAN interface 366 can be a communication interface which complies with the IEEE 802.20 Mobile Broadband Wireless Access (MBWA) specifications for IP-based services.

As described above with reference to FIG. 1, the CED 135 includes a Bluetooth interface 366 and is therefore Bluetooth-enabled meaning that it includes a Bluetooth-compliant communication interface including a Bluetooth antenna 367 and a Bluetooth chipset having a Bluetooth controller and a host (not illustrated in FIG. 3) as defined in the any of the Bluetooth communication standards that are incorporated by reference herein. The Bluetooth chipset generates signals to be transmitted via the Bluetooth antenna 367, and also receives signals transmitted from the Bluetooth-enabled interface 266 of the vehicle 102 via Bluetooth antenna 267. In this regard, it is noted that the Bluetooth interface 366 of the CED 135 includes a Bluetooth antenna 367 and one or more Bluetooth chipset(s) (not illustrated) so that it is capable of implementing all known Bluetooth standards and protocols including a Bluetooth Low Energy (BLE) protocol.

Further, in one embodiment, the Bluetooth interface 366 (or alternatively the processor 320) includes a signal processing module that is configured to process or determine signal strength information from signals that are communicated from the Bluetooth interface 266 of the vehicle 102 to determine the proximity of the CED 135 to the vehicle 102 (e.g., to determine the approximate distance between the CED 135 and the Bluetooth interface 266 of the AHU 160). For example, in one embodiment, the signal processing module can determine/measure signal strength information (e.g., a received signal strength indicator (RSSI)) associated with signals received by the CED 135 and process the signal strength information (e.g., a RSSI) to determine the distance of the CED 135 from the vehicle. In one implementation, the signal processing module can generate a reporting message that includes the signal strength information and approximate distance of the CED 135 from the vehicle 102. In this regard, it is noted that RSSI is just one exemplary metric that can be used to determine distance from the vehicle 102. Alternatively, any other link quality indicators, such as a Bluetooth proximity profile, can be used to determine the distance between the Bluetooth-enabled CED 135 and the Bluetooth interface 366. The proximity profile is defined in the Bluetooth low energy standard. The proximity profile uses a number of metrics including signal strength information, state of the battery charge, whether a device is connected, etc. to characterize the proximity of one BLE enabled device (e.g., the CED 135) to another BLE enabled device (e.g., the Bluetooth interface 366).

The CED 135 can be pre-paired with the AHU 160 meaning that it is pre-authorized to establish the wireless connection with the wireless communication interface 366 and exchange information with the AHU 160. The CED 135 can establish a wireless connection with the wireless communication interface 366 when it is within communication range of the wireless communication interface 366. In one embodiment, the wireless connection is a Bluetooth connection such that the pre-paired CED 135 can connect to the wireless communication interface 366 when it is within Bluetooth communication range.

Application

In accordance with the disclosed embodiments, the instructions 328 that are stored in the computer-readable storage medium 325 include an application 329 that includes computer-executable instructions that are executable by the processor 320.

In one embodiment, in response to a trigger event (e.g., shutting-off the vehicle 102 and/or de-activating the AHU and/or receiving an indication that an occupant has left the vehicle), the application 329 can be loaded and executed at the processor 320. When executed by the processor 320, the application 329 is configured to determine whether the pre-paired CED 135 is connected to the wireless communication interface 266, and whether the pre-paired CED 135 has moved during the time period during the time period after receiving the indication that the trigger event has occurred. In some embodiments, the application 329 can also wait for indications that different events have occurred before determining whether the pre-paired CED 135 has moved during the time period after receiving the indication that the trigger event has occurred. The different indications that can be used vary depending on the implementation. For example, in one embodiment, the AHU 160 can receive a first indication from the sensor 240-2 that the door of the vehicle 102 has opened, and can communicate the first indication to the application 329. Further, after receiving the first indication, the application 329 can wait to receive a second indication that the wireless connection to the wireless communication interface 266 has terminated, and/or a third indication from sensor 240-3 that the door has locked.

Depending on the implementation, any of these indications can be communicated to the application 329 directly from the wireless communication interface 266 when the wireless connection between the wireless interface 266 of the AHU 160 and the wireless interface 366 of the pre-paired CED 135 is available, or indirectly from the telematics server 190 when the wireless connection between the wireless interface 266 of the AHU 160 and the wireless interface 366 of the pre-paired CED 135 is not available (e.g., has been terminated). The telematics server 190 communicates the third indication to the application 329 in response to receiving a notification signal from the AHU 160 (that is transmitted by the embedded NAD 130) that indicates that the door has locked.

After receiving the indication that the trigger event has occurred (and possibly the other indications noted above), the application 329 can determine whether the pre-paired CED 135 has moved. In one embodiment, the pre-paired CED 135 includes measurement devices 380 including at least one accelerometer 388 that produces accelerometer data. The application 329 can save this accelerometer data to a storage medium 325. For example, in response to receiving the second indication, the application 329 can save accelerometer data provided from the accelerometer 388 at regular intervals to storage medium 325 as first accelerometer data. The application 329 will continue to save the first accelerometer data until a first stop command is received. The first stop command can be issued upon expiration of a pre-determined duration that begins after receiving the second indication.

After receiving the first indication, the application 329 can wait to receive the third indication that the door has locked, and then start saving the accelerometer data (provided from the accelerometer 388) at regular intervals to the storage medium 325 as second accelerometer data until a second stop command is received to stop saving. The second stop command is issued upon expiration of a pre-determined duration after receiving the third indication that occurs after the first stop command was issued.

The application 329 can then determine whether the first accelerometer data differs from the second accelerometer data. Thus, when the first accelerometer data does not differ (or substantially differ) from the second accelerometer data, the processor 320 determines that the pre-paired CED 135 has not moved (during the time after receiving the indication that the trigger event has occurred). For example, in one embodiment where the trigger event is a door locking, when the first accelerometer data and the second accelerometer data are determined to be substantially similar, this indicates that the CED 135 has not moved since the door was locked, but when the first accelerometer data and the second accelerometer data are different, this indicates that the CED 135 has moved since the door was locked.

In one embodiment, to determine whether or not the CED 135 has moved since the door was locked, the application 329 can determine whether the first accelerometer data and the second accelerometer data are similar by comparing the first accelerometer data and the second accelerometer data and determining if the percentage difference between a mean/average of the first accelerometer data and a mean/average of the second accelerometer data is less than or equal to a threshold, and if so, then this will indicate that the pre-paired CED 135 is not moving or has not moved (during the time after receiving the indication that the trigger event has occurred). In another alternative embodiment, to determine whether or not the CED 135 has moved since the door was locked, the application 329 can determine whether the second accelerometer has a constant active signal. If the signal from pre-paired CED 135 has a relatively low signal activity, then this will indicate that the pre-paired CED 135 is not moving or has not moved (during the time after receiving the indication that the trigger event has occurred).

When the pre-paired CED 135 has not moved, this will indicate that the pre-paired CED 135 has been left inside the vehicle 102, which will cause the pre-paired CED 135 to communicate a signal that results in the activation of one or more of the vehicular systems 250 and causes them to generate another signal, that is perceptible outside the vehicle 102, and indicates that the pre-paired CED 135 has been left inside the vehicle 102. For example, when it is determined that the pre-paired CED 135 has not moved, the second processor 320 can transmit a notification message that indicates that the pre-paired CED 135 has been left inside the vehicle 102.

In response to receiving the notification message, the telematics server 190 can transmit an alert signal to the embedded NAD 130 of the vehicle 102, and the embedded NAD 130 can then communicate the alert signal to a processor (e.g., the processor 220) in the vehicle 102 that controls the vehicular system 250 of the vehicle 102.

In response to receiving the alert signal, the processor 220 of the vehicle 102 can execute computer-executable instructions that are configured to control activation of the vehicular system 250. In particular, the processor 220 can cause the vehicular system 250 to generate another signal that is perceptible outside the vehicle 102. Activation of this signal indicates that the pre-paired CED 135 has been left inside the vehicle 102.

Further details regarding the application will now be described below with reference to FIGS. 4-6.

Figure 4:
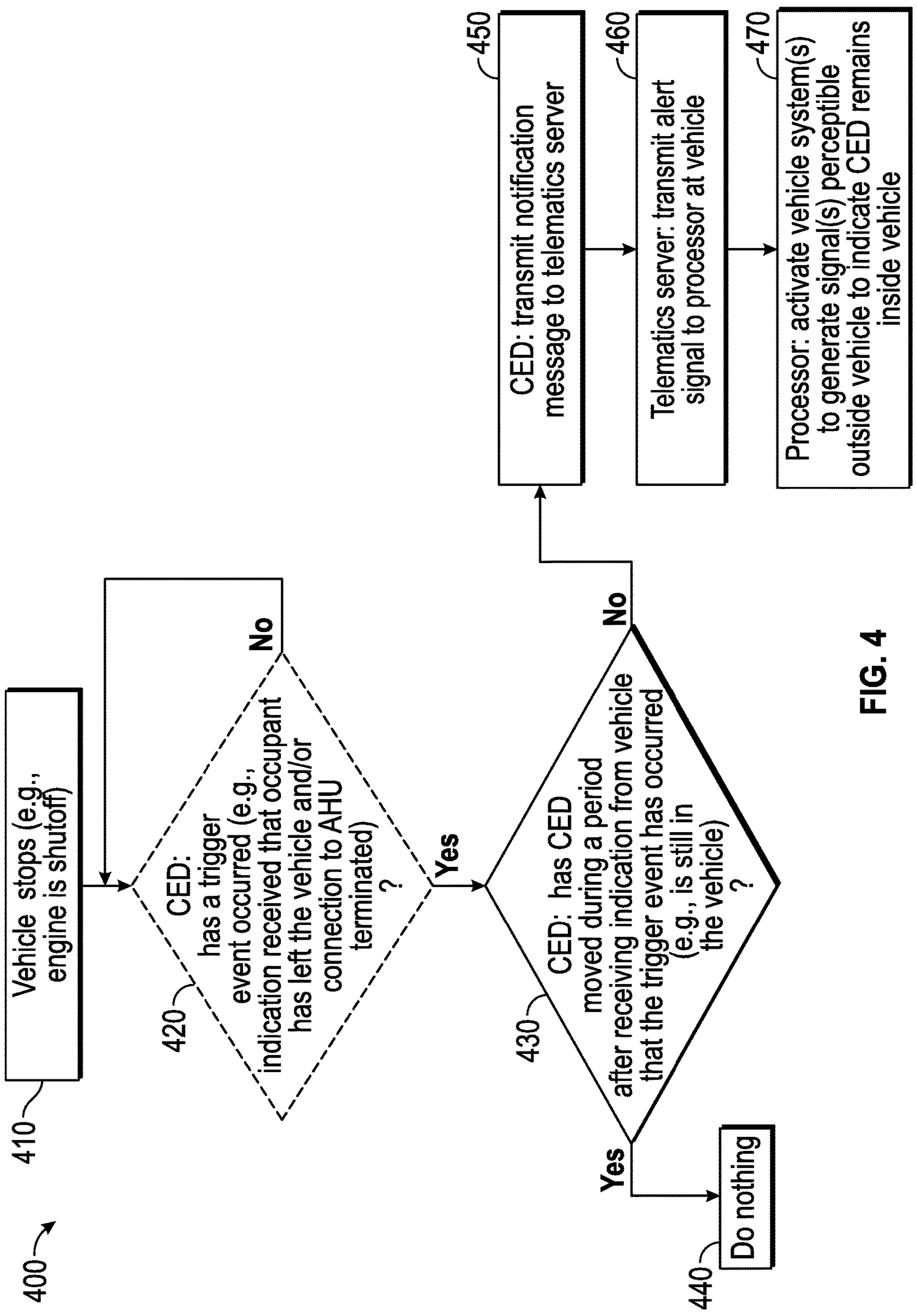
FIG. 4 is a flow chart that illustrates a method for providing a notification at a vehicle that a CED is inside the vehicle when an occupant leaves the vehicle in accordance with some of the disclosed embodiments.

FIG. 4 is a flow chart that illustrates a method for providing a notification at a vehicle 102 that a consumer electronics device (CED) 135 is inside the vehicle when an occupant leaves the vehicle in accordance with some of the disclosed embodiments. FIG. 4 will be described with reference to FIGS. 1-3. It should be understood that steps of the method 400 are not necessarily presented in any particular order and that performance of some or all the steps in an alternative order is possible and is contemplated. The steps have been presented in the demonstrated order for ease of description and illustration. Further, steps can be added, omitted, and/or performed simultaneously without departing from the scope of the appended claims. It should also be understood that the illustrated method 400 can be ended at any time. In certain embodiments, some or all steps of this process, and/or substantially equivalent steps, are performed by execution of computer-readable instructions stored or included on a computer-readable medium, for example. For instance, references to a processor performing functions of the present disclosure refer to any one or more interworking computing components executing instructions, such as in the form of an algorithm, provided on a computer-readable medium, such as a memory associated with the processor of the onboard computer system 110 of vehicle 102, of the remote telematics server 190, and/or of a CED 135.

Method 400 begins at block 410 when the vehicle 102 is parked and its engine is shut-off. The onboard computer system 110 (and the AHU 160) will not immediately deactivate (e.g., turn off or enter an inactive state) when the vehicle 102 shuts-off at block 402, but will remain on for a time period needed to carry out the method 400. This time period will vary depending on the implementation. In some implementations, before the method 400 proceeds to block 420, a timer or counter can be started at 410 when the vehicle 102 turns-off, and when a certain time expires or count is reached without receiving an indication that a trigger event or events has/have occurred, the method 400 can automatically end. In addition, it is noted that in this embodiment, whenever a vehicle door opens, closes or is locked after the engine is shut-off, the wireless connection between the wireless interface 266 of the AHU 160 and the wireless interface 366 of the pre-paired CED 135 will be terminated, and the AHU 160 will communicate a termination signal to the processor 220 to indicate that the wireless connection has been terminated. Although the wireless interface 366 of the pre-paired CED 135 will already have state information indicating that the wireless connection has terminated, the processor 220 of the vehicle 102 can also communicate the termination signal to the pre-paired CED 135 to confirm that the connection has terminated, and to indicate to the application 329 at the pre-paired CED 135 that it should begin saving information used to determine whether the pre-paired CED 135 has moved or is moving. As will be described below, in one embodiment, this information can be accelerometer information. In another alternative embodiment, this information can be information from a gyroscope in the pre-paired CED 135 that can be used to determine whether the pre-paired CED 135 has moved or is moving. For example, when the CED 135 does not include an accelerometer (and therefore accelerometer information is not available), information from a gyroscope can be used instead to indicate whether the orientation of the CED 135 has changed.

Depending on the implementation, following block 410, the method 400 either proceeds to optional block 420 or directly to block 430. In other words, block 420 is optional and is not implemented in all embodiments. Block 420 can be implemented to perform an additional check or checks to confirm whether or not the occupant/owner has left the vehicle before determining whether or not the pre-paired CED 135 has remained stationary (and is therefore still within the vehicle 102) or has moved and is therefore is most likely with the occupant/owner. For example, in some cases, the occupant/owner might have inadvertently left their pre-paired CED 135 inside the vehicle 102 after closing and/or locking the doors, and if the pre-paired CED 135 has not moved during a certain period after the doors were closed and/or locked, then this likely means that the pre-paired CED 135 is still within the vehicle 102. When block 420 is not implemented, the method 400 proceeds directly to block 430 after the onboard computer system 110 communicates to the CED 135 that the vehicle 102 has shut-off at block 410.

At block 420, it is determined whether a trigger event has occurred. For instance, in one embodiment, a processor 320 within the pre-paired CED 135 can determine whether the trigger event has occurred. The trigger event can be, for example, receiving at the processor 320 (1) an indication (from either the processor 220 of the vehicle 102 or the wireless interface 366 of the pre-paired CED 135) that the wireless connection between the wireless interface 266 of the AHU 160 and the wireless interface 366 of the pre-paired CED 135 has terminated, and (2) one or more indications at the processor 320 from the processor 220 that indicate that the occupant has left the vehicle (e.g., door has opened, closed and been locked). Execution of block 420 loops until a trigger event is detected and an indication is received at the pre-paired CED 135 that a trigger event has occurred (or until the timer expires or the counter reaches its max count), then proceeds to block 430.

At block 430, the processor 320 of the pre-paired CED 135 can execute processing to determine whether the pre-paired CED 135 has moved during a certain time period. This time period can be, for example, during the time since the vehicle stopped (at block 410) or during the time that has elapsed since the trigger event occurred (at block 420). In one embodiment, at block 430, the pre-paired CED 135 can process sensor data generated at the CED 135 (e.g., by accelerometers or other inertial devices that are integrated within the pre-paired CED 135) to determine whether the pre-paired CED 135 has moved (or is currently moving).

When the pre-paired CED 135 has moved during the relevant time period (e.g., since the door closed and/or was locked), it is likely that it was picked up and carried out of the vehicle 102. Therefore, when the processor 320 of the pre-paired CED 135 determines (at block 430) that the pre-paired CED 135 has moved during the relevant time period, the method 400 proceeds to block 440, where method 400 ends. In other words, nothing is done since it can be presumed that the pre-paired CED 135 has left the vehicle since it has moved during the time after the door was closed and/or locked.

By contrast, when the pre-paired CED 135 has not moved during the relevant time period, it is likely that the pre-paired CED 135 was not carried out of the vehicle 102. Therefore, when the pre-paired CED 135 determines that the pre-paired CED 135 has not moved (at block 430), it is presumed that the pre-paired CED 135 has been left in the vehicle 102 (or alternatively on or nearby the vehicle 102), and the method 400 proceeds to block 450, where the pre-paired CED 135 transmits a notification message to the telematics server 190.

At block 460, the telematics server 190, in response to the notification message, transmits an alert signal to the embedded NAD 130 of the vehicle 102, and upon receipt, the embedded NAD 130 forwards the alert signal to a processor of the vehicle 102 (e.g., the processor 220 of the onboard computer system 110).

At block 470, the processor 220 generates one or more control signals to activate one or more vehicle systems 255 (such as the lights, a horn, an audio system, etc.) to cause it/them to generate an audible signal and/or a visible signal that is perceptible to bystanders who are located outside the vehicle including the owner of the CED 135. For example, these signals can be honking the horn of the vehicle, flashing the vehicle's internal or external lighting system, an audio indication that is communicated over an audio system of the vehicle (e.g., forgot CED), and/or another visual indication. These signals are generated to attempt to notify or alert the owner of the pre-paired CED 135 that the pre-paired CED 135 is still inside the vehicle 102 so that they can retrieve it before departing on to their location.

Figure 5:
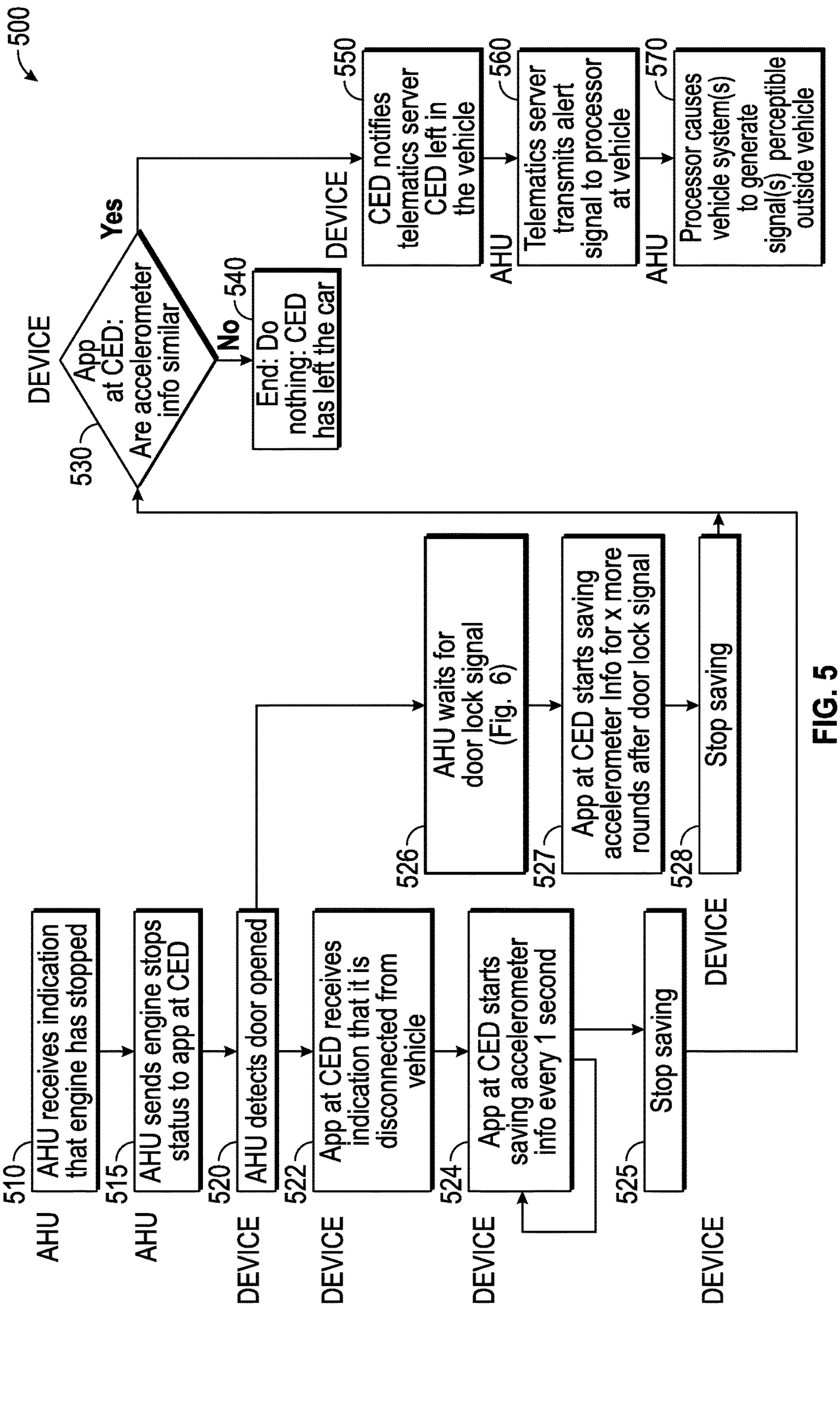
FIG. 5 illustrates a method for providing a notification at a vehicle that a CED is inside the vehicle when an occupant leaves the vehicle in accordance with one implementation of some of the disclosed embodiments.

FIG. 5 illustrates a method 500 for providing a notification at a vehicle 102 that a consumer electronics device (CED) 135 is inside the vehicle when an occupant leaves the vehicle in accordance with one implementation of some of the disclosed embodiments. It should be understood that steps of the method 500 are not necessarily presented in any particular order and that performance of some or all the steps in an alternative order is possible and is contemplated. The steps have been presented in the demonstrated order for ease of description and illustration. Further, steps can be added, omitted, and/or performed simultaneously without departing from the scope of the appended claims. It should also be understood that the illustrated method 500 can be ended at any time. In certain embodiments, some or all steps of this process, and/or substantially equivalent steps, are performed by execution of computer-readable instructions stored or included on a computer-readable medium, for example. For instance, references to a processor performing functions of the present disclosure refer to any one or more interworking computing components executing instructions, such as in the form of an algorithm, provided on a computer-readable medium, such as a memory associated with the processor of the onboard computer system 110 of vehicle 102, of the remote server 190, and/or of a CED 135.

Method 500 begins at block 510 when the processor 220 within the onboard computer system 110 (e.g., at the AHU 160) receives a message that the vehicle's engine has stopped (e.g., from sensor 240-1).

At block 515, the onboard computer system 110 transmits a message to an application 329 that is running at the pre-paired CED 135 to indicate that the vehicle 102 has been turned off or stopped.

At block 520, an indication is received by a processor 220 within the onboard computer system 110 (e.g., from sensor 240-2) that a door of the vehicle has opened. This indication can also be communicated (e.g., via interface 266) from the AHU 160 to the pre-paired CED 135. In this embodiment, after communicating the indication (that the door has opened) to the pre-paired CED 135, the AHU 160 can terminate the wireless connection between the wireless interface 266 of the AHU 160 and the wireless interface 366 of the pre-paired CED 135. The AHU 160 can also communicate a termination signal to the processor 220 to indicate that the wireless connection has been terminated. Although the wireless interface 366 of the pre-paired CED 135 will already have state information indicating that the wireless connection has terminated, the processor 220 of the vehicle 102 can also communicate the termination signal to the pre-paired CED 135 to confirm that the connection has terminated, and to indicate to the application 329 at the pre-paired CED 135 that it should begin saving accelerometer information.

Following block 520, two parallel data collection processes start at the pre-paired CED 135 as indicated by the two arrows coming out of block 520. One data collection sequence is represented in FIG. 5 by blocks 522, 524, 525, and the other data collection sequence is represented in FIG. 5 by blocks 526, 527, 528.

When the processor 220 of the onboard computer system 110 determines (at block 520) that the door has opened, it communicates a message to the application 329 at the pre-paired CED 135 indicating that the door has opened and that the wireless connection between the wireless interface 266 of the AHU 160 and the wireless interface 366 of the pre-paired CED 135 has terminated.

Upon receiving this message, the application 329 at the pre-paired CED 135 can confirm that interface 366 is no longer connected to the wireless communication interface 266 of the AHU 160. This can happen for example, because the onboard computer system 110 and the wireless communication interface 266 is shut off, and pre-paired CED 135 is no longer receiving a signal to indicate that the two are connected. When the application 329 at the pre-paired CED 135 confirms (at block 522) that the pre-paired CED 135 is no longer connected to the wireless communication interface 266 of the AHU 160, the method 500 proceeds to block 524. When method 500 proceeds from block 522 to block 524. At block 524, as soon as the application 329 receives an indication that a save event has occurred (e.g., door has opened, engine stops or turns off, etc.), the application 329 can begin saving accelerometer data received from the accelerometer 388 for a period. The rate at which the application 329 saves the accelerometer data and the duration at which the application 329 saves the accelerometer data can vary depending on the implementation. In one embodiment, the application can save accelerometer data once every second for a period that begins after the save event occurs until an indication is received that a stop event has occurred (e.g., door lock signal is received, door closed signal is received, a timer has expired, or a counter has reached a predetermined count, etc.). At block 525, the pre-paired CED 135 stops saving the first accelerometer data when the stop event occurs. Thus, the first accelerometer data is obtained over a certain period that starts as soon the pre-paired CED 135 receives an indication that it is no longer connected and that a save event has occurred, and stops at block 525 when the stop event occurs.

When method 500 proceeds to block 526, the AHU 160 waits to receive a signal indicating that the doors of the vehicle have been locked. In most cases, once the doors have been locked, occupants will begin walking away from the vehicle 102, and therefore, if they have the pre-paired CED 135 with them, the pre-paired CED 135 will be moving.

Once a signal is received (at the pre-paired CED 135) indicating that the doors have locked, then at block 527, the application 329 begins saving accelerometer data for a certain time period that begins when the pre-paired CED 135 receives the signal indicating that the doors have locked. The application 329 stops saving (at block 527) accelerometer data (at block 528) when a stop signal is generated (e.g., after a predetermined count has been reached or a predetermined amount of time has passed since the signal (indicating that the doors of the vehicle have been locked) was received at block 526). This second accelerometer data is obtained over a different period that starts as soon the pre-paired CED 135 receives an indication that the doors have been locked, and stops at block 528 after another time period has elapsed. It is noted that in one implementation, block 528 can be performed after block 570 (e.g., the stop signal can be generated at block 528 when the CED 135 receives a confirmation that vehicle systems have generated signals perceptible outside the vehicle, and/or another confirmation has been made at step 530 that the CED 135 still has not moved during a particular period of time).

At block 530, the application 329 compares the first accelerometer data to the second accelerometer data and determines whether the accelerometer data recorded at block 524 and at block 527 is the same (or substantially similar). In this regard, the "same" or "substantially similar" can mean a difference of between +/−1.5 g, where the unit g refers to a unit of measure of acceleration relative to acceleration due to gravity (e.g., one g is the acceleration due to gravity at the Earth's surface, or 9.80665 meters per second squared). This way the first accelerometer data recorded after the door has been opened can be compared to second accelerometer data recorded after the vehicle doors have been locked.

When the second accelerometer data is different than the first accelerometer data, then this indicates that the pre-paired CED 135 has moved since doors locked, which indicates that it is no longer likely to be in the vehicle. In other words, when the accelerometer data are different, it can be determined that the pre-paired CED 135 is no longer in the vehicle 102 (e.g., is likely with the owner), and the method proceeds to block 540, where the method 500 ends.

By contrast, the second accelerometer data will be the same as (or substantially similar to) the first accelerometer data if the pre-paired CED 135 has not moved (and has not been moving) after the doors have been locked, which means that the pre-paired CED 135 is stationary and remains inside the vehicle 102. After it has been determined that the pre-paired CED 135 is not moving (and thus likely still located inside the vehicle 102 somewhere), additional steps can be performed (as indicated by blocks 550-570) to help alert the owner of the pre-paired CED 135 that the pre-paired CED 135 has been left in the vehicle 102.

At block 550, the application 329 at the pre-paired CED 135 can generate and transmit a request message to the telematics server 190 to indicate that the CED 135 has been left in the vehicle and to request that an alert signal be communicated to the vehicle 102 (e.g., to the embedded NAD 130 and then to the processor 220).

At block 560, upon receiving the request message at the telematics server 190, an application hosted at the telematics server 190 generates an alert signal or message that is communicated back to the NAD 130. The NAD 130 can then provide the alert signal to the processor 220 of the vehicle 102, which can then process the alert signal to generate appropriate controls signals at block 570. The control signals generated at 570 are used to control one or more vehicle systems 255 as described above to cause, for example, honking the horn of the vehicle 102 or flashing of the vehicle's internal or external lights to alert the user that the pre-paired CED 135 remains in the vehicle 102. Following block 570, the method 500 ends.

Figure 6:
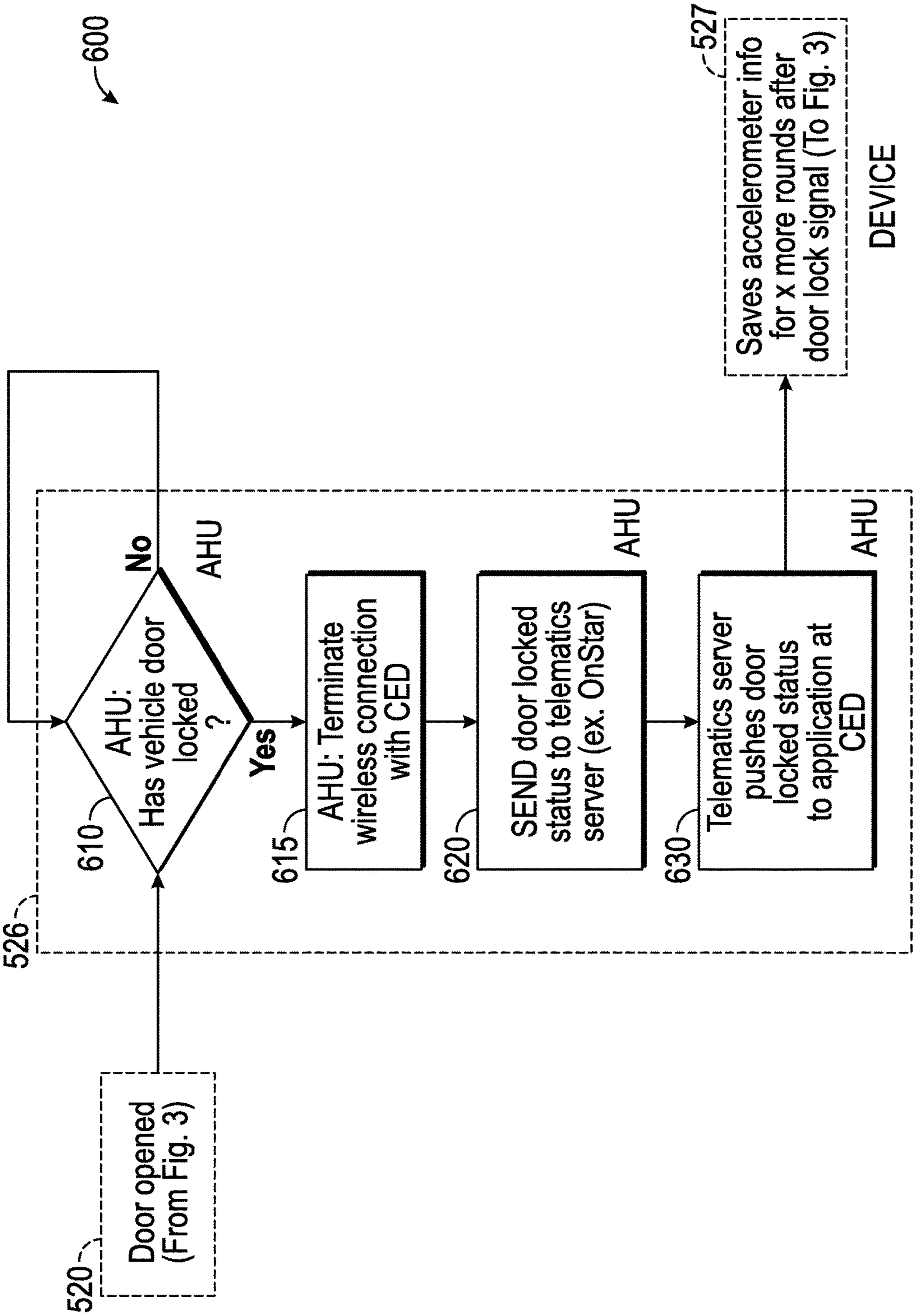
FIG. 6 illustrates one example of a method that can be performed at the AHU to provide an indication to the pre-paired CED that a door of the vehicle has been locked in accordance with the disclosed embodiments.

FIG. 6 illustrates one example of a method 600 that can be performed at the AHU 160 to provide an indication to the pre-paired CED 135 that a door of the vehicle 102 has been locked in accordance with the disclosed embodiments.

At block 610, after receiving an indication that the door has been opened, the AHU 160 determines whether a signal has been received that indicates that the doors of the vehicle 102 have been locked. In one embodiment, the processor 220 receives the door lock signal from a door sensor 240-3 that is configured to detect whether the door has been locked, and sends this signal to the AHU 160. Alternatively, a key FOB can communicate this signal to the processor 220 or wireless communication interface 266 of the AHU 160. As shown, the processing at block 630 continues until the AHU 160 receives a signal indicating that the door has been locked.

When the signal is received, the method 600 then proceeds to block 620, where the AHU 160 sends (via the embedded NAD 130) a signal to the telematics server 190 that includes a door lock status message that indicates that the door has been locked.

At block 630, the telematics server 190 communicates a message indicating the door lock status to the application 329 running at the pre-paired CED 135, and the method 600 proceeds to step 527 of FIG. 5 as described above.

Figure 7:
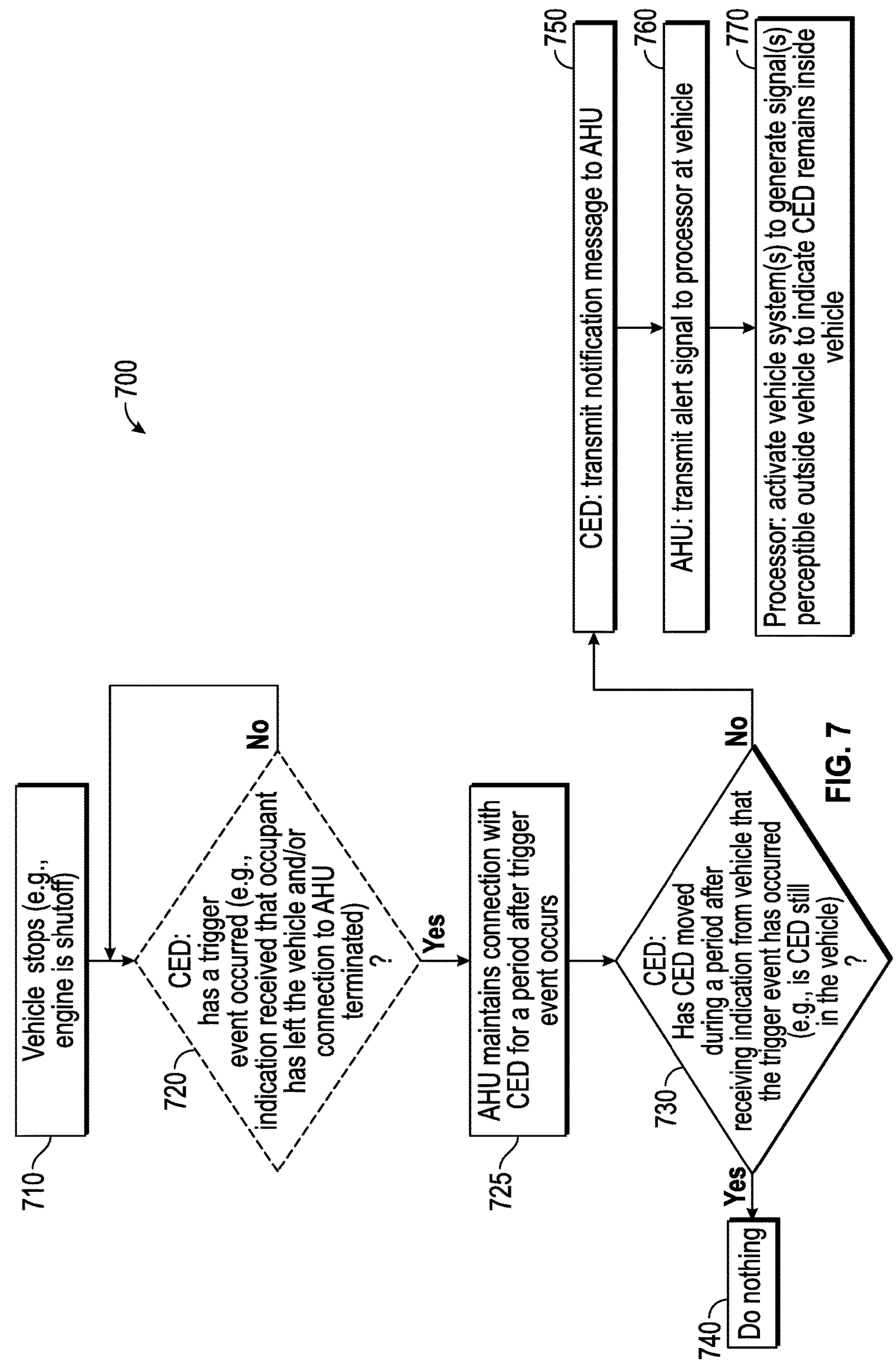
FIG. 7 is a flow chart that illustrates a method for providing a notification at a vehicle that a consumer electronics device (CED) is inside the vehicle when an occupant leaves the vehicle in accordance with some of the disclosed embodiments.

FIG. 7 is a flow chart that illustrates a method for providing a notification at a vehicle 102 that a consumer electronics device (CED) 135 is inside the vehicle when an occupant leaves the vehicle in accordance with some of the disclosed embodiments. FIG. 7 will be described with reference to FIGS. 1-3. In addition, it is noted that blocks 710, 730, 740, and 770 of FIG. 7 are the same as blocks 410, 430, 440 and 470 of FIG. 4, and therefore, for sake of brevity, the description of those common block of FIG. 7 will not be repeated. Instead, only the blocks 720, 725, 750, 760 of FIG. 7 that are different than those in FIG. 4 will be described below. It should be understood that steps of the method 700 are not necessarily presented in any particular order and that performance of some or all the steps in an alternative order is possible and is contemplated. The steps have been presented in the demonstrated order for ease of description and illustration. Further, steps can be added, omitted, and/or performed simultaneously without departing from the scope of the appended claims. It should also be understood that the illustrated method 700 can be ended at any time. In certain embodiments, some or all steps of this process, and/or substantially equivalent steps, are performed by execution of computer-readable instructions stored or included on a computer-readable medium, for example. For instance, references to a processor performing functions of the present disclosure refer to any one or more interworking computing components executing instructions, such as in the form of an algorithm, provided on a computer-readable medium, such as a memory 225 associated with the processor 220 of the onboard computer system 110 of vehicle 102, of the remote telematics server 190, and/or of a CED 135.

Preliminarily, it is noted that in this embodiment, whenever a vehicle door opens, closes or is locked after the engine is shut-off, the wireless connection between the wireless interface 266 of the AHU 160 and the wireless interface 366 of the pre-paired CED 135 will not be automatically terminated, but will remain on for a duration needed to carry out the method 700. As such, unlike the embodiment of FIG. 4, the AHU 160 will not communicate a termination signal to the processor 220 to indicate that the wireless connection has been terminated, but will instead maintain the wireless connection to allow method 700 to proceed so that the wireless interface 266 of the AHU 160 and the wireless interface 366 of the pre-paired CED 135 can continue to communicate information directly with one another instead of having the pre-paired CED 135 receive communications from the processor 220 via a telematics server 190.

At block 720, it is determined whether a trigger event has occurred. For instance, in one embodiment, the processor 320 within the pre-paired CED 135 can determine whether the trigger event has occurred. The trigger event can be, for example, receiving at the processor 320 one or more indications at the processor 320 from the processor 220 that indicate that the occupant has left the vehicle (e.g., door has opened, closed and been locked). Execution of block 720 loops until a trigger event is detected and an indication is received at the pre-paired CED 135 that a trigger event has occurred (or until the timer expires or the counter reaches its max count), and the method 700 can then proceed to block 730. After it is determined that a trigger event has occurred (at block 720), the method 700 proceeds to block 725, where the AHU starts a timer that runs for a duration that specifies how long the AHU 160 will maintain the wireless connection between the wireless interface 266 of the AHU 160 and the wireless interface 366 of the pre-paired CED 135. This way, the processor 220 of the vehicle 102 can continue to directly communicate information via the wireless interface 266 of the AHU 160 to the wireless interface 366 of the pre-paired CED 135, which can then communicate that information to the application 329 at the pre-paired CED 135 as will be described below, and vice-versa. In the embodiment of FIG. 4, this would not be possible because the wireless connection would be terminated after the trigger event occurs.

At block 750, the pre-paired CED 135 directly transmits a notification message to the wireless interface 266 of the AHU 160.

At block 760, in response to the notification message, the AHU 160 transmits an alert signal to a processor of the vehicle 102 (e.g., the processor 220 of the onboard computer system 110).

Figure 8:
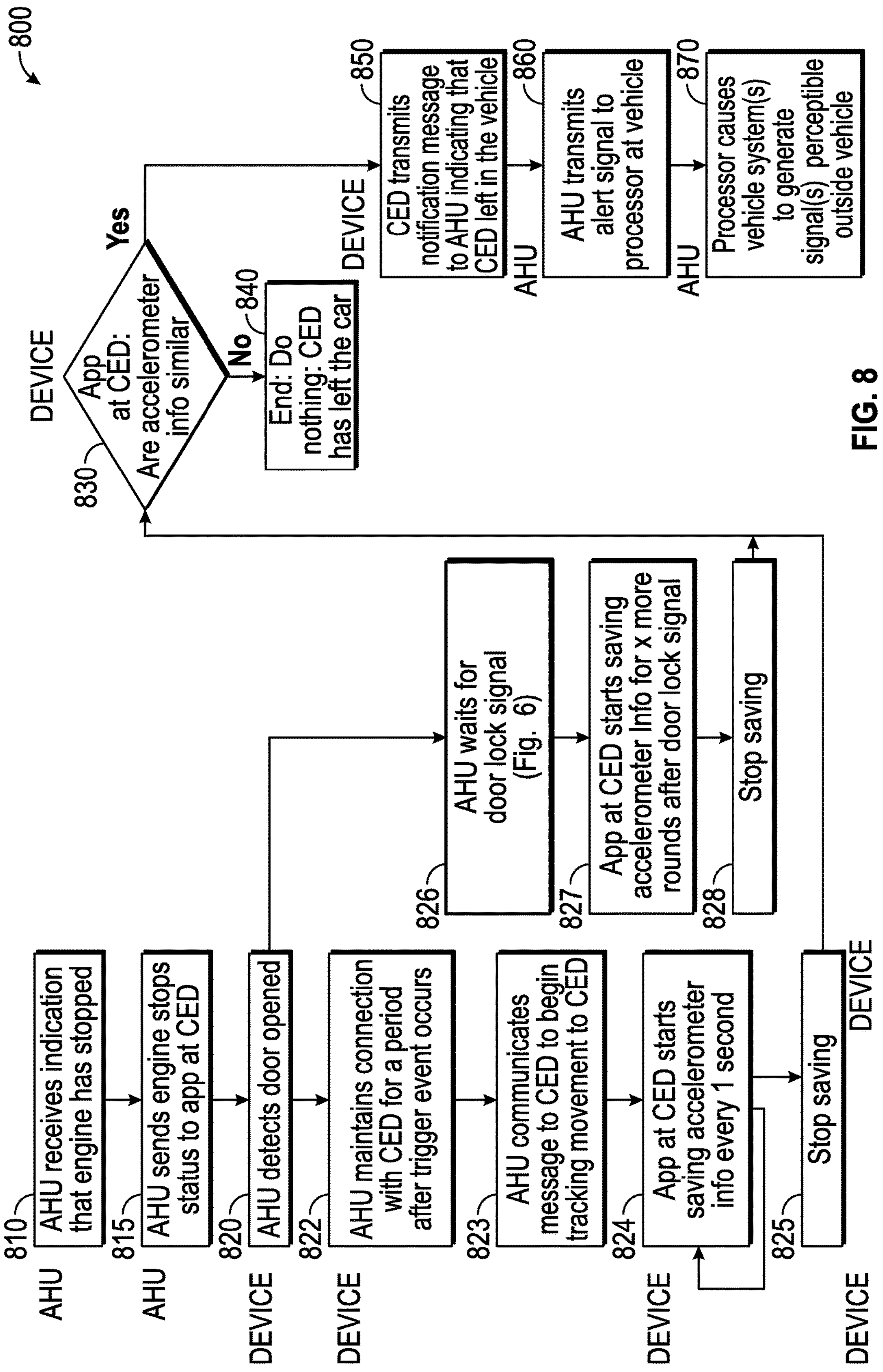
FIG. 8 illustrates a method for providing a notification at a vehicle that a consumer electronics device (CED) is inside the vehicle when an occupant leaves the vehicle in accordance with one implementation of some of the disclosed embodiments.

FIG. 8 illustrates a method 800 for providing a notification at a vehicle 102 that a consumer electronics device (CED) 135 is inside the vehicle when an occupant leaves the vehicle in accordance with one implementation of some of the disclosed embodiments. In FIG. 8 blocks 810 and 870 is the same as blocks 410 and 470 of FIG. 4, blocks 815, 820 and 824-840 of FIG. 8 are the same as blocks 515, 520 and 524-540 of FIG. 5, and blocks 825, 850, and 860 of FIG. 8 are the same as blocks 725, 750, and 760 of FIG. 7, and therefore, for sake of brevity, the description of these common blocks of FIGS. 4, 5 and 7 will not be repeated. It should be understood that steps of the method 800 are not necessarily presented in any particular order and that performance of some or all the steps in an alternative order is possible and is contemplated. The steps have been presented in the demonstrated order for ease of description and illustration. Further, steps can be added, omitted, and/or performed simultaneously without departing from the scope of the appended claims. It should also be understood that the illustrated method 800 can be ended at any time. In certain embodiments, some or all steps of this process, and/or substantially equivalent steps, are performed by execution of computer-readable instructions stored or included on a computer-readable medium, for example. For instance, references to a processor performing functions of the present disclosure refer to any one or more interworking computing components executing instructions, such as in the form of an algorithm, provided on a computer-readable medium, such as a memory associated with the processor of the onboard computer system 110 of vehicle 102, of the remote server 190, and/or of a CED 135.

The foregoing description has been presented for purposes of illustration and description, but is not intended to be exhaustive or limit the scope of the claims. The embodiments described above are described to best explain one practical application, and to enable others of ordinary skill in the art to understand the invention for various embodiments with various modifications as are suited to the particular use contemplated.

In some instances, well-known components, systems, or methods have not been described in detail in order to avoid obscuring the present disclosure. Therefore, specific operational and functional details disclosed herein are not to be interpreted as limiting, but merely as a representative basis for teaching one skilled in the art.

Those of skill in the art would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the description above includes a general context of computer-executable instructions, the present disclosure can also be implemented in combination with other program modules and/or as a combination of hardware and software. The terms "application," "algorithm," "program," "instructions," or variants thereof, are used expansively herein to include routines, program modules, programs, components, data structures, algorithms, and the like, as commonly used. These structures can be implemented on various system configurations, including single-processor or multiprocessor systems, microprocessor-based electronics, combinations thereof, and the like. Although various algorithms, instructions, etc. are separately identified herein, various such structures may be separated or combined in various combinations across the various computing platforms described herein.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

The block diagrams in the Figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that, in some alternative implementations, the functions noted in the block may occur out of the order noted in the figures. It will also be noted that each block of the block diagrams and/or flowchart illustration, and combinations of blocks in the block diagrams can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

The detailed description provides those skilled in the art with a convenient road map for implementing the exemplary embodiment or exemplary embodiments. Many modifications and variations will be apparent to those of ordinary skill in the art without departing from the scope and spirit of the invention.

The above-described embodiments are merely exemplary illustrations of implementations set forth for a clear understanding of the principles of the disclosure. The exemplary embodiments are only examples, and are not intended to limit the scope, applicability, or configuration of the disclosure in any way. While exemplary embodiments have been presented in the foregoing detailed description, it should be appreciated that a vast number of variations exist. Variations, modifications, and combinations may be made to the above-described embodiments without departing from the scope of the claims. For example, various changes can be made in the function and arrangement of elements without departing from the scope of the disclosure as set forth in the appended claims and the legal equivalents thereof. All such variations, modifications, and combinations are included herein by the scope of this disclosure and the following claims.

What is claimed is:

1. A system, comprising:

a vehicle comprising: a wireless interface, a first processor, and a vehicular system controllable via the first processor; and a pre-paired consumer electronics device (CED) communicatively coupled to the wireless interface via a wireless connection, wherein the pre-paired CED is configured to execute computer-executable instructions of an application that is configured to determine, when an indication is received that a trigger event has occurred at the vehicle, whether the pre-paired CED has been left inside the vehicle, and generate a signal that indicates that the pre-paired CED has been left inside the vehicle when the application determines that the pre-paired CED has been left inside the vehicle; and wherein the pre-paired CED is configured to transmit the signal to the wireless interface, and wherein the first processor is configured to receive the signal from the wireless interface and to control activation of the vehicular system, in response to the signal from the pre-paired CED, to cause the vehicular system to generate an alert signal that is perceptible outside the vehicle to indicate that the pre-paired CED has been left inside the vehicle;

wherein the wireless connection between the wireless interface of the vehicle and the pre-paired CED is terminated when a trigger event occurs, and wherein the application is configured to determine whether the pre-paired CED has been left inside the vehicle during a time period after the trigger event has occurred, and wherein the signal received by the first processor is an alert signal received by the wireless interface, and further comprising:

a telematics server configured to generate the alert signal in response to receiving a notification message from the pre-paired CED, and to indirectly communicate the alert signal to the first processor.

2. A system according to claim 1, wherein the pre-paired CED, comprises:

a second processor configured to execute an application in response to receiving an indication that the trigger event has occurred, wherein the application comprises computer-executable instructions that when executed by the second processor are configured to:

determine whether the pre-paired CED has moved after receiving the indication that the trigger event has occurred; and transmit, when it is determined that the pre-paired CED has not moved, a notification message that indicates that the pre-paired CED has been left inside the vehicle.

3. A system according to claim 2, wherein the vehicle further comprises:

an embedded network access device (NAD) for communicating with the telematics server, and a wireless communication interface configured to establish a wireless connection with the pre-paired CED when in communication range of the pre-paired CED; and a plurality of sensors comprising: a first sensor configured to detect the trigger event and to communicate a trigger message to the first processor that indicates that the trigger event has occurred, and wherein the wireless communication interface is configured to transmit the trigger message to the application running at the pre-paired CED.

4. A system according to claim 3, wherein the trigger event is the engine of the vehicle stopping, and wherein the wherein the trigger message indicates that the engine of the vehicle has stopped.

5. A system according to claim 3, wherein the vehicle further comprises: a door, wherein the plurality of sensors further comprise: a second sensor that detects whether the door has been opened, and wherein the first processor is further configured to:

receive a first indication from the second sensor that the door of the vehicle has opened, wherein the wireless communication interface is further configured to: communicate the first indication to the application running at the pre-paired CED.

6. A system according to claim 5, wherein the pre-paired CED is further configured to receive a second indication that the wireless connection to the wireless communication interface has terminated.

7. A system according to claim 6, wherein the vehicle further comprises: a door, wherein the plurality of sensors comprise a third sensor that detects whether the door has been locked and generates a lock signal that indicates that the door has been locked when door has been locked, and wherein the pre-paired CED further comprises an accelerometer, and wherein the second processor of the pre-paired CED is configured to determine whether the pre-paired CED has moved by executing the computer-executable instructions of the application to:

in response to receiving the second indication, save accelerometer data provided from the accelerometer at regular intervals to memory of the pre-paired CED as first accelerometer data until a first stop command is received to stop saving, wherein the first stop command is issued after a pre-determined duration after receiving the second indication;

wait, after receiving the first indication, to receive a third indication that the door has locked;

in response to receiving the third indication, save the accelerometer data provided from the accelerometer at regular intervals to memory of the pre-paired CED as second accelerometer data until a second stop command is received to stop saving, wherein the second stop command is issued after the first stop command is issued and upon expiration of a pre-determined duration after receiving the third indication; and determine whether the first accelerometer data differs from the second accelerometer data.

8. A system according to claim 7, wherein the second processor of the pre-paired CED determines that the pre-paired CED has not moved after receiving the indication that the trigger event has occurred when the first accelerometer data does not differ from the second accelerometer data.

9. A system according to claim 7, wherein the first processor is configured to execute computer-executable instructions configured to:

determine whether the lock signal has been received from the third sensor; and communicate a notification signal to the embedded NAD that indicates that the door has locked;

wherein the embedded NAD transmits the notification signal to the telematics server;

wherein the telematics server, in response to receiving the notification signal, is configured to generate the third indication that the door has locked, and to communicate the third indication to the application executing at the pre-paired CED.

10. A system according to claim 3, wherein the telematics server is configured to: transmit the alert signal to the embedded NAD of the vehicle in response to receiving the notification message; and further comprising:

communicating the alert signal from the embedded NAD to a processor in the vehicle that controls the vehicular system of the vehicle.

11. A system according to claim 1, wherein the wireless connection between the wireless interface and the pre-paired CED is maintained for a time period after a trigger event occurs, and wherein the signal received by the first processor is a notification message that indicates that the application has determined that the pre-paired CED has been left inside the vehicle, and wherein the wireless interface is configured to: receive the notification message communicated directly from the pre-paired CED to the wireless interface over the wireless connection after the trigger event occurs; and communicate the notification message to the first processor, wherein the first processor is configured to generate an alert signal in response to the notification message.

12. A computer-implemented method for providing notification that a pre-paired consumer electronics device (CED) is located inside a vehicle, wherein the vehicle comprises a first processor, a vehicular system controllable via the first processor, and a wireless interface communicatively coupled to the pre-paired CED via a wireless connection, and wherein the pre-paired CED comprises a second processor configured to execute an application comprising computer-executable instructions, the computer-implemented method comprising:

in response to receiving an indication that a trigger event has occurred at the second processor, determining, at the application executed by the second processor of the pre-paired CED, whether the pre-paired CED has moved during the period after receiving the indication that the trigger event has occurred;

when the application determines that the pre-paired CED has not moved during the period after receiving the indication that the trigger event has occurred: transmitting a signal from the pre-paired CED to the first processor of the vehicle that indicates that the application has determined that the pre-paired CED has been left inside the vehicle when the application determines that the pre-paired CED has been left inside the vehicle; and in response to receiving the signal from the pre-paired CED at the first processor of the vehicle, executing computer-executable instructions at the first processor to control activation of the vehicular system to cause the vehicular system to generate an alert signal that is perceptible outside the vehicle to indicate that the pre-paired CED has been left inside the vehicle;

wherein the wireless connection between the wireless interface of the vehicle and the pre-paired CED is terminated when the trigger event occurs, and wherein the application is configured to determine whether the pre-paired CED has been left inside the vehicle during a time period after the trigger event has occurred, and further comprising:

transmitting, from the pre-paired CED when the second processor determines that the pre-paired CED has not moved, a notification message to a telematics server that indicates that the pre-paired CED has been left inside the vehicle;

wherein transmitting the signal to the first processor of the vehicle, comprises:

transmitting, from the telematics server in response to receiving the notification message, an alert signal to the first processor of the vehicle via the wireless interface, wherein the alert signal indicates that the application has determined that the pre-paired CED has been left inside the vehicle.

13. A computer-implemented method according to claim 12, wherein the vehicle further comprises: a plurality of sensors comprising a first sensor; an embedded network access device (NAD) for communicating with a telematics server; and a wireless communication interface configured to establish a wireless connection with the pre-paired CED when in communication range of the pre-paired CED, and the computer-implemented method further comprising:

detecting the trigger event at the first sensor, and communicating a trigger message to the wireless communication interface that indicates that the trigger event has occurred; and transmitting the trigger message from the wireless communication interface to the application running at the pre-paired CED.

14. A computer-implemented method according to claim 13, wherein the trigger event is the engine of the vehicle stopping, and wherein the trigger message indicates that the engine of the vehicle has stopped.

15. A computer-implemented method according to claim 13, wherein the vehicle further comprises: a door, wherein the plurality of sensors further comprise a second sensor that detects whether the door has been opened, and the computer-implemented method further comprising:

receiving a first indication from the second sensor that the door of the vehicle has opened;

communicating, from the wireless communication interface, the first indication to the application running at the pre-paired CED; and receiving, at the pre-paired CED, a second indication that the wireless connection to the wireless communication interface has terminated.

16. A computer-implemented method according to claim 15, wherein the vehicle further comprises: a door, wherein the plurality of sensors further comprise a third sensor that detects whether the door has been locked and generates a lock signal that indicates that the door has been locked when door has been locked, and wherein the pre-paired CED further comprises an accelerometer.

17. A computer-implemented method according to claim 16, wherein the step of determining whether the pre-paired CED has moved, comprises:

in response to receiving the second indication at the pre-paired CED, saving accelerometer data provided from the accelerometer to memory of the pre-paired CED at regular intervals as first accelerometer data until a first stop command is received to stop saving, wherein the first stop command is issued after a pre-determined duration after receiving the second indication;

after receiving the first indication, waiting to receive a third indication that the door has locked;

in response to receiving the third indication at the pre-paired CED, saving accelerometer data provided from the accelerometer to memory of the pre-paired CED at regular intervals as second accelerometer data until a second stop command is received to stop saving, wherein the second stop command is issued after the first stop command is issued and upon expiration of a pre-determined duration after receiving the third indication; and determining, at the second processor of the pre-paired CED, whether the first accelerometer data differs from the second accelerometer data.

18. A computer-implemented method according to claim 17, the computer-implemented method further comprising:

determining, at the second processor of the pre-paired CED after receiving the indication that the trigger event has occurred, that the pre-paired CED has not moved when the first accelerometer data does not differ from the second accelerometer data.

19. A computer-implemented method according to claim 17, further comprising:

determining whether the lock signal has been received from the third sensor; and generating a notification signal that indicates that the door has locked;

transmitting the notification signal from the embedded NAD to the telematics server;

generating, at the telematics server in response to receiving the notification signal, the third indication that the door has locked, and communicating the third indication to the application executing at the pre-paired CED.

20. A computer-implemented method according to claim 13, further comprising:

in response to receiving the notification message, transmitting the alert signal from the telematics server to the embedded NAD; and communicating the alert signal from the embedded NAD to the first processor in the vehicle that controls the vehicular system of the vehicle.

21. A computer-implemented method according to claim 12, wherein the wireless connection between the wireless interface of the vehicle and the pre-paired CED is maintained for a time period after the trigger event occurs, and comprises: wherein transmitting the signal to the first processor of the vehicle, comprises: when the application determines that the pre-paired CED has not moved during the period after receiving the indication that the trigger event has occurred: directly transmitting a notification message from the pre-paired CED directly to the wireless interface of the vehicle, wherein the notification message indicates that the application of the pre-paired CED has determined that the pre-paired CED has been left inside the vehicle.

* * * * *